(12) United States Patent
Liu

(10) Patent No.: US 7,834,886 B2
(45) Date of Patent: Nov. 16, 2010

(54) METHODS AND APPARATUS FOR DYNAMIC CORRECTION OF DATA FOR NON-UNIFORMITY

(75) Inventor: Yu Liu, Ottawa (CA)

(73) Assignee: Ross Video Limited, Iroquois, Ontario (CA)

( * ) Notice: Subject to any disclaimer, the term of this patent is extended or adjusted under 35 U.S.C. 154(b) by 681 days.

(21) Appl. No.: 11/826,726

(22) Filed: Jul. 18, 2007

(65) Prior Publication Data
US 2009/0021528 A1 Jan. 22, 2009

(51) Int. Cl.
| | |
|---|---|
| G09G 5/00 | (2006.01) |
| G09G 5/02 | (2006.01) |
| H04N 9/64 | (2006.01) |
| H04N 9/74 | (2006.01) |
| H04N 1/46 | (2006.01) |
| G06K 9/00 | (2006.01) |
| G06K 9/40 | (2006.01) |
| G06K 9/36 | (2006.01) |

(52) U.S. Cl. ............ 345/592; 345/589; 345/606; 345/618; 345/586; 348/251; 348/538; 348/586; 348/578; 358/517; 358/525; 358/540; 358/561; 382/169; 382/254; 382/274; 382/283

(58) Field of Classification Search ............ 345/428, 345/581, 586, 589, 592, 600, 606, 618, 620, 345/624, 629–630, 626, 643; 348/239, 251, 348/254, 538, 528–533, 563–564, 578, 586, 348/587, 590, 592, 615; 358/517–519, 525, 358/540

See application file for complete search history.

(56) References Cited

U.S. PATENT DOCUMENTS

| | | | | |
|---|---|---|---|---|
| 5,032,901 | A | * | 7/1991 | Vlahos ............... 348/587 |
| 5,327,247 | A | | 7/1994 | Osborne et al. |
| 5,424,781 | A | * | 6/1995 | Vlahos ............... 348/587 |
| 5,907,315 | A | * | 5/1999 | Vlahos et al. ......... 382/167 |
| 6,346,994 | B1 | | 2/2002 | Inoue |
| 6,844,883 | B2 | | 1/2005 | Bakhmutsky |
| 7,075,574 | B2 | | 7/2006 | Niko |
| 7,102,787 | B2 | | 9/2006 | Tamamura |
| 2003/0086018 | A1 | * | 5/2003 | Berman et al. ......... 348/584 |

OTHER PUBLICATIONS

D. Tomazevic, B. Likar and F. Pernus, "Comparative Evaluation of Retrospective Shading Correction Methods," Journal of Microscopy, vol. 208, Pt. 3, Dec. 2002, pp. 212-223.

Ian T. Young, "Shading Correction: Compensation for Illumination and Sensor Inhomogeneities," Jul. 19, 2000, pp. 1-14.

* cited by examiner

*Primary Examiner*—Wesner Sajous
(74) *Attorney, Agent, or Firm*—Nixon Peabody LLP; Jeffrey L. Costellia

(57) ABSTRACT

Methods and apparatus for dynamic correction of data for non-uniformity are disclosed. Feature data are extracted from input video data that include a subject shot against a backing area in a solid color. The feature data may describe characteristics of non-uniformity in input video data. A curve is generated based on the extracted feature data, and correction factors are formed based on the generated curve. At least one of the input video data and alpha data associated with the input video data is corrected based on the correction factors.

21 Claims, 13 Drawing Sheets

METHODS AND APPARATUS FOR DYNAMIC CORRECTION OF DATA FOR NON-UNIFORMITY

CROSS REFERENCE TO RELATED DOCUMENTS

The present invention is related to commonly assigned U.S. patent application Ser. No. 11/072,502 of LIU et al., entitled "Method, System, and Device for Automatic Determination of Nominal Backing Color and A Range Thereof," filed Mar. 7, 2005, which claims benefit of priority to U.S. Provisional Patent Application Ser. No. 60/556,504 of LIU et al., entitled "Method, System, and Device for Automatic Determination of Nominal Backing Color and A Range Thereof," filed Mar. 26, 2004, the entire disclosures of all of which are hereby incorporated by reference herein.

BACKGROUND

1. Field of the Invention

The present invention relates generally to video processing and live video composition, and more particularly to a method, system and device for video data correction, video data compensation, and the like, for example, for use in live video composition applications, and the like. The present invention is related to technologies referenced in the List of References section of the present specification, and in brackets throughout the present specification, the entire disclosures of all of which are hereby incorporated by reference herein.

2. Discussion of the Background

In recent years, the technique of video data correction has been widely used in video display devices, such as plasma, LCD, other projector devices, and the like. However, the present invention is intended to apply such a technique to a different application such as a picture shot in a live video studio, where a character is positioned in front of a solid color wall, such as green wall or blue wall, and a video composition superposes this picture on a new background by cutting the solid backing color area off and replacing it with the new picture content.

Generally, the process of cutting the backing color off a foreground picture is called a chromakey process or chromakey function in a live video composition. This process normally generates a signal called alpha signal or alpha channel, which identifies various areas on the foreground picture with values ranging from 0 to 1. For example, a value of 1 indicates a foreground object, a value of 0 indicates a backing area, and a value of 0.5 indicates semitransparent objects on the foreground. This alpha signal is also used to represent the transparency or opacity of the foreground picture when overlaid on the new background picture.

Various problems can arise when removing the solid backing color and generating the alpha channel. Accordingly, various data correction techniques have been employed, including methods of correcting various types of flaws, such as seams, brim, wrinkles, and dirty marks on back walls or backdrops. However, such techniques can include various disadvantages and problems that still need to be addressed.

SUMMARY OF THE INVENTION

Therefore, there is a need for a method, system, and device that addresses the above and other problems with conventional systems and methods. Accordingly, in exemplary aspects of the present invention, a method, system, and device are provided for dynamic data correction of non-uniformity in live video composition where still and moving subjects shot against a backing area in a solid color such as blue or green by a video camera are clipped out and overlaid on a new background.

According to an aspect of the invention, there is provided a method comprising extracting feature data from input video data, the input video data comprising a subject shot against a backing area in a solid color, generating a curve based on the extracted feature data, forming correction factors based on the generated curve, and correcting at least one of the input video data and alpha data associated with the input video data based on the correction factors.

The feature data may describe with certainty characteristics of non-uniformity in the input video data.

The input video data may comprise one of the following color spaces and respective video signal components:

| Color Space | Video Signal Components | | |
|---|---|---|---|
| CIE $YC_rC_b$ | Y: luminance | $C_r$: red color difference | $C_b$: blue color difference |
| CIE RGB | R: red primary color | G: green primary color | B: blue primary color |
| HSL | L: luminance | H: hue | S: saturation |
| HSV/HSB | V: brightness | H: hue | S: saturation |
| CYMK | C: cyan color | Y: yellow color | M: magenta |
| YUV | Y: luminance | U: modified blue difference | V: modified red difference |
| YIQ | Y: luminance | I: modified red difference | Q: modified blue difference. |

The operation of extracting may include horizontal accumulation for each row, where at row i:

$$f_{acc}^h(i) = \sum_j f(i,j)w(i,j),$$

$$w_{acc}^h(i) = \sum_j w(i,j), \text{ and}$$

average data at row i is given by:

$$f_{avg}^h(i) = \frac{f_{acc}^h(i)}{w_{acc}^h(i)}, \text{ and}$$

vertical accumulation for each column, where at column j:

$$f_{acc}^v(j) = \sum_i f(i,j)w(i,j),$$

$$w_{acc}^v(j) = \sum_i w(i,j), \text{ and}$$

average data at column j is $f_{avg}^v(j)$ given by:

$$f_{avg}^v(j) = \frac{f_{acc}^v(j)}{w_{acc}^v(j)}.$$

The operation of generating may involve modelling the feature data using an L-order polynomial $$g(x) = \sum_{k=0}^{L} c_k x^k,$$

wherein a sum of weighted square errors is given by:

$$E = \sum_x w_{acc}(x)(g(x) - f_{avg}(x))^2,$$

minimizing a sum of weighted square errors to determine the (L+1) coefficients of the L-order polynomial as:

$$(c_0, c_1, c_2, \ldots, c_L) = \underset{(c_0, c_1, \ldots c_L)}{\arg\min}\{E\},$$

fitting the horizontal average video data to an M-order polynomial $g^h(j)$, wherein an error $E_h$ represents a difference between a fitting model and the average data from the vertical accumulation, $E_h$ being given by:

$$E_h = \sum_j w_{acc}^v(j)(g^h(j) - f_{avg}^v(j))^2,$$

$$= \sum_j w_{acc}^v(j)\left(\sum_k c_k^h j^k - f_{avg}^v(j)\right)^2,$$

minimizing $E_h$ to determine a vector of (M+1) coefficients as:

$$\begin{bmatrix} c_0^h \\ c_1^h \\ \ldots \\ c_M^h \end{bmatrix} = \begin{bmatrix} A_0^h & A_1^h & \cdots & A_M^h \\ A_1^h & A_2^h & \cdots & A_{M+1}^h \\ \ldots & \ldots & \ldots & \ldots \\ A_M^h & A_{M+1}^h & \cdots & A_{2M}^h \end{bmatrix}^{-1} \begin{bmatrix} B_0^h \\ B_1^h \\ \ldots \\ B_M^h \end{bmatrix}$$

where:

$$A_k^h = \sum_j w_{acc}^v(j) j^k, k = 0, 1, \ldots, M,$$

and $$B_k^h = \sum_j w_{acc}^v(j) f_{avg}^v(j) j^k, k = 0, 1, \ldots, M,$$

fitting the vertical average video data to an N-order polynomial $g^v(i)$, wherein an error $E_v$ represents a difference between a fitting model and the average data from the horizontal accumulation, $E_v$ being given by:

$$E_v = \sum_i w_{acc}^h(i)(g^v(i) - f_{avg}^h(i))^2,$$

$$= \sum_i w_{acc}^h(i)\left(\sum_k c_k^v i^k - f_{avg}^h(i)\right)^2,$$

and minimizing $E_v$ to determine a vector of (N+1) coefficients as:

$$\begin{bmatrix} c_0^v \\ c_1^v \\ \ldots \\ c_N^v \end{bmatrix} = \begin{bmatrix} A_0^v & A_1^v & \cdots & A_N^v \\ A_1^v & A_2^v & \cdots & A_{N+1}^v \\ \ldots & \ldots & \ldots & \ldots \\ A_N^v & A_{N+1}^v & \cdots & A_{2N}^v \end{bmatrix}^{-1} \begin{bmatrix} B_0^v \\ B_1^v \\ \ldots \\ B_N^v \end{bmatrix},$$

where:

$$A_k^v = \sum_i w_{acc}^h(i) i^k, k = 0, 1, \ldots, N,$$

and $$B_k^v = \sum_i w_{acc}^h(i) f_{avg}^h(i) i^k, k = 0, 1, \ldots, N.$$

The operation of forming may involve determining horizontal multiplicative correction factors as:

$$C_{mult}^h(j) = \frac{d^h}{g^h(j)} = \frac{d^h}{\sum_{k=0}^{M} c_k^h j^k}, \text{ and}$$

determining vertical multiplicative correction factors as:

$$C_{mult}^v(i) = \frac{d^v}{g^v(i)} = \frac{d^v}{\sum_{k=0}^{N} c_k^v i^k},$$

where $d^h$ and $d^v$ are constants, determined according to a method selected from the following:

| Method & Explanation | d = function($g_{max}$, $g_{min}$, $f_{ref}$) |
|---|---|
| Average the reference backing color and the in-between maximum and minimum data | $\frac{2g_{max} + g_{min} + f_{ref}}{4}$ |
| Center around reference backing color and compensate for deviation from it | $\frac{g_{max} + g_{min} + 2f_{ref}}{4}$ |
| Center around average | $\frac{g_{max} + g_{min} + f_{ref}}{3}$ |
| Suppress lightest area and illuminate darkest area | $\frac{g_{max} + g_{min}}{2}$ |
| Center around reference only | $f_{ref}$ |
| Illuminate all dark area and keep bright area unchanged but likely scale up the noise | $g_{max}$ |
| Suppress all lightest area and keep dark area unchanged, likely scale down the noise | $g_{min}$ | wherein $f_{ref}$ is a constant represented in a color component selected from the following, corresponding to the type of video data to be accumulated:

| Color Space | Video Signal Components | | |
|---|---|---|---|
| CIE YC$_r$C$_b$ | Y: luminance | C$_r$: red color difference | C$_b$: blue color difference |
| CIE RGB | R: red primary color | G: green primary color | B: blue primary color |
| HSL | L: luminance | H: hue | S: saturation |
| HSV/HSB | V: brightness | H: hue | S: saturation |
| CYMK | C: cyan color | Y: yellow color | M: magenta |
| YUV | Y: luminance | U: modified blue difference | V: modified red difference |
| YIQ | Y: luminance | I: modified red difference | Q: modified blue difference | wherein $f_{ref}$ is obtained from one of 1) a reference backing color chosen by a user, from pictures to be processed, by means of a GUI (Graphical User Interface), and 2) a reference backing color automatically generated by an algorithm.

The operation of forming may involve one of:

determining additive correction factors as a difference between a standard reference and the fitting model, a horizontal additive correction factor being given by:

$$C_{add}^{h}(j) = d^h - g^h(j), \text{ and}$$

a vertical additive correction factor being given by:

$$C_{add}^{v}(i) = d^v - g^v(i),$$

wherein only one of the additive correction factors is used in the correcting, and determining a combined additive correction factor as:

$$C_{add}^{hv} = d^{hv}\left(1 - \frac{g^v(i)g^h(j)}{d^v d^h}\right)$$

where $d^{hv}$ is a constant selected from the following:

| Method & Explanation | $d^{hv}$ |
|---|---|
| Horizontal style | $d^h$ |
| Vertical style | $d^v$ |
| Average style | $\dfrac{d^h + d^v}{2}$ |
| Reference style | $f_{ref}$ |

In some embodiments, correcting involves performing a multiplicative correction, an additive correction, or a combined additive and multiplicative correction, the multiplicative correction being given by:

$$f'(i,j) = f(i,j) * C_{mult}^{v}(i) * C_{mult}^{h}(j),$$

the additive correction being defined by:

$$f'(i,j) = f(i,j) + C_{add}^{hv}(i,j), \text{ and}$$

the combined correction being defined by combining $C_{mult}^{v}(i)$, $C_{mult}^{h}(j)$, $C_{add}^{v}(i)$, $C_{add}^{h}(j)$, including a combination selected from the following:

| Method & Explanation | f'(i, j) |
|---|---|
| Adds offset horizontally then modulates vertically. | $(f(i,j) + C_{add}^{h}(j)) \times C_{mult}^{v}(i)$ |
| Adds offset vertically then modulates horizontally. | $(f(i,j) + C_{add}^{v}(i)) \times C_{mult}^{h}(j)$ |
| Modulates vertically then adds offset horizontally | $f(i,j) \times C_{mult}^{v}(i) + C_{add}^{h}(j)$ |
| Modulates horizontally then adds offset vertically | $f(i,j) \times C_{mult}^{h}(j) + C_{add}^{v}(i).$ |

The alpha data may be resultant data which are produced by feeding the input video data into a chromakey function to generate a signal of magnitude ranging from 0 to 1, in which case the alpha data represent the opacity or transparency of the input video data in a video composition process.

The operation of extracting may involve generating a weight for a pixel of the input video data, accumulating the weight from each pixel, accumulating a resultant value of the weight multiplied with the input video data at each pixel to be processed, storing the accumulated weight, and storing the accumulated resultant value.

Such a method may be embodied, for example, in instructions stored on a computer-readable medium.

An apparatus is also provided, and includes a feature extraction unit operable to extract feature data from input video data, the input video data comprising a subject shot against a backing area in a solid color, a data fitting unit operatively coupled to the feature extraction unit and operable to generate a curve based on the feature data extracted by the feature extraction unit and to form correction factors based on the generated curve, and a data correction unit operatively coupled to the data fitting unit and operable to correct at least one of the input video data and alpha data associated with the input video data based on the correction factors.

the feature data may describe with certainty characteristics of non-uniformity in the input video data.

The input video data may include one of the following color spaces and respective video signal components:

| Color Space | Video Signal Components | | |
|---|---|---|---|
| CIE YC$_r$C$_b$ | Y: luminance | C$_r$: red color difference | C$_b$: blue color difference |
| CIE RGB | R: red primary color | G: green primary color | B: blue primary color |
| HSL | L: luminance | H: hue | S: saturation |
| HSV/HSB | V: brightness | H: hue | S: saturation |
| CYMK | C: cyan color | Y: yellow color | M: magenta |
| YUV | Y: luminance | U: modified blue difference | V: modified red difference |
| YIQ | Y: luminance | I: modified red difference | Q: modified blue difference. |

The feature extraction unit may be operable to extract the feature data by performing horizontal accumulation for each row, where at row i:

$$f_{acc}^{h}(i) = \sum_{j} f(i,j)w(i,j),$$

-continued $$w_{acc}^h = \sum_j w(i, j), \text{ and}$$

average data at row i is given by:

$$f_{avg}^h(i) = \frac{f_{acc}^h(i)}{w_{acc}^h(i)};$$

and by performing vertical accumulation for each column, where at column j:

$$f_{acc}^v(j) = \sum_i f(i, j)w(i, j),$$

$$w_{acc}^v(i) = \sum_i w(i, j), \text{ and}$$

average data at column j is $f_{avg}^v(j)$ given by:

$$f_{avg}^v(j) = \frac{f_{acc}^v(j)}{w_{acc}^v(j)}.$$

The data fitting unit may be operable to generate a curve by: modelling the feature data using an L-order polynomial $$g(x) = \sum_{k=0}^{L} c_k x^k,$$

wherein a sum of weighted square errors is given by:

$$E = \sum_x w_{acc}(x)(g(x) - f_{avg}(x))^2,$$

minimizing a sum of weighted square errors to determine the (L+1) coefficients of the L-order polynomial as:

$$(c_0, c_1, c_2, \ldots, c_L) = \underset{(c_0, c_1, \ldots c_L)}{\arg \min}\{E\},$$

fitting the horizontal average video data to an M-order polynomial $g^h(j)$, wherein an error $E_h$ represents a difference between a fitting model and the average data from the vertical accumulation, $E_h$ being given by:

$$E_h = \sum_j w_{acc}^v(j)(g^h(j) - f_{avg}^v(j))^2,$$

$$= \sum_j w_{acc}^v(j)\left(\sum_k c_k^h j^k - f_{avg}^v(j)\right)^2,$$

minimizing $E_h$ to determine a vector of (M+1) coefficients as:

$$\begin{bmatrix} c_0^h \\ c_1^h \\ \ldots \\ c_M^h \end{bmatrix} = \begin{bmatrix} A_0^h & A_1^h & \cdots & A_M^h \\ A_1^h & A_2^h & \cdots & A_{M+1}^h \\ \ldots & \ldots & \ldots & \ldots \\ A_M^h & A_{M+1}^h & \cdots & A_{2M}^h \end{bmatrix}^{-1} \begin{bmatrix} B_0^h \\ B_1^h \\ \ldots \\ B_M^h \end{bmatrix}$$

where:

$$A_k^h = \sum_j w_{acc}^v(j)j^k, k = 0, 1, \ldots, M,$$

and $$B_k^h = \sum_j w_{acc}^v(j)f_{avg}^v(j)j^k, k = 0, 1, \ldots, M,$$

fitting the vertical average video data to an N-order polynomial $g^v(i)$, wherein an error $E_v$ represents a difference between a fitting model and the average data from the horizontal accumulation, $E_v$ being given by:

$$E_v = \sum_i w_{acc}^h(i)(g^v(i) - f_{avg}^h(i))^2,$$

$$= \sum_i w_{acc}^h(i)\left(\sum_k c_k^v i^k - f_{avg}^h(i)\right)^2, \text{ and}$$

minimizing $E_v$ to determine a vector of (N+1) coefficients as:

$$\begin{bmatrix} c_0^v \\ c_1^v \\ \ldots \\ c_N^v \end{bmatrix} = \begin{bmatrix} A_0^v & A_1^v & \cdots & A_N^v \\ A_1^v & A_2^v & \cdots & A_{N+1}^v \\ \ldots & \ldots & \ldots & \ldots \\ A_N^v & A_{N+1}^v & \cdots & A_{2N}^v \end{bmatrix}^{-1} \begin{bmatrix} B_0^v \\ B_1^v \\ \ldots \\ B_N^v \end{bmatrix},$$

where:

$$A_k^v = \sum_i w_{acc}^h(i)i^k, k = 0, 1, \ldots, N,$$

and $$B_k^v = \sum_i w_{acc}^h(i)f_{avg}^h(i)i^k, k = 0, 1, \ldots, N.$$

The data fitting unit may be operable to form correction factors by:

determining horizontal multiplicative correction factors as:

$$C_{mult}^h(j) = \frac{d^h}{g^h(j)} = \frac{d^h}{\sum_{k=0}^{M} c_k^h j^k}, \text{ and}$$

determining vertical multiplicative correction factors as:

$$C_{mult}^v(i) = \frac{d^v}{g^v(i)} = \frac{d^v}{\sum_{k=0}^{N} c_k^v i^k},$$

where $d^h$ and $d^v$ are constants, determined according to a method selected from the following:

| Method & Explanation | d = function($g_{max}$, $g_{min}$, $f_{ref}$) |
|---|---|
| Average the reference backing color and the in-between maximum and minimum data | $\dfrac{2g_{max} + g_{min} + f_{ref}}{4}$ |
| Center around reference backing color and compensate for deviation from it | $\dfrac{g_{max} + g_{min} + 2f_{ref}}{4}$ |
| Center around average | $\dfrac{g_{max} + g_{min} + f_{ref}}{3}$ |
| Suppress lightest area and illuminate darkest area | $\dfrac{g_{max} + g_{min}}{2}$ |
| Center around reference only | $f_{ref}$ |
| Illuminate all dark area and keep bright area unchanged but likely scale up the noise | $g_{max}$ |
| Suppress all lightest area and keep dark area unchanged, likely scale down the noise | $g_{min}$ | wherein $f_{ref}$ is a constant represented in a color component selected from the following, corresponding to the type of video data to be accumulated:

| Color Space | Video Signal Components | | |
|---|---|---|---|
| CIE $YC_rC_b$ | Y: luminance | $C_r$: red color difference | $C_b$: blue color difference |
| CIE RGB | R: red primary color | G: green primary color | B: blue primary color |
| HSL | L: luminance | H: hue | S: saturation |
| HSV/HSB | V: brightness | H: hue | S: saturation |
| CYMK | C: cyan color | Y: yellow color | M: magenta |
| YUV | Y: luminance | U: modified blue difference | V: modified red difference |
| YIQ | Y: luminance | I: modified red difference | Q: modified blue difference | wherein $f_{ref}$ is obtained from one of 1) a reference backing color chosen by a user, from pictures to be processed, by means of a GUI (Graphical User Interface), and 2) a reference backing color automatically generated by an algorithm.

In some embodiments, the data fitting unit is operable to form correction factors by one of:

determining additive correction factors as a difference between a standard reference and the fitting model, a horizontal additive correction factor being given by:

$$C_{add}^h(j) = d^h - g^h(j), \text{ and}$$

a vertical additive correction factor being given by:

$$C_{add}^v(j) = d^v - g^v(i),$$

wherein only one of the additive correction factors is used in the correcting; and determining a combined additive correction factor as:

$$C_{add}^{hv} = d^{hv}\left(1 - \dfrac{g^v(i)g^h(j)}{d^v d^h}\right)$$

where $d^{hv}$ is a constant selected from the following:

| Method & Explanation | $d^{hv}$ |
|---|---|
| Horizontal style | $d^h$ |
| Vertical style | $d^v$ |
| Average style | $\dfrac{d^h + d^v}{2}$ |
| Reference style | $f_{ref}$ |

The data correction unit may be operable to correct the at least one of the input video data and the alpha data associated with the input video data by performing a multiplicative correction, an additive correction, or a combined additive and multiplicative correction, the multiplicative correction being given by:

$$f'(i,j) = f(i,j) * C_{mult}^v(i) * C_{mult}^h(j),$$

the additive correction being defined by:

$$f'(i,j) = f(i,j) + C_{add}^{hv}(i,j), \text{ and}$$

the combined correction being defined by combining $C_{mult}^v(i)$, $C_{mult}^h(j)$, $C_{add}^v(i)$, $C_{add}^h(j)$, including a combination selected from the following:

| Method & Explanation | f'(i, j) |
|---|---|
| Adds offset horizontally then modulates vertically. | $(f(i, j) + C_{add}^h(j)) \times C_{mult}^v(i)$ |
| Adds offset vertically then modulates horizontally. | $(f(i, j) + C_{add}^v(i)) \times C_{mult}^h(j)$ |
| Modulates vertically then adds offset horizontally | $f(i, j) \times C_{mult}^v(i) + C_{add}^h(j)$ |
| Modulates horizontally then adds offset vertically | $f(i, j) \times C_{mult}^h(j) + C_{add}^v(i).$ |

The alpha data may be resultant data which are produced by feeding the input video data into a chromakey function to generate a signal of magnitude ranging from 0 to 1, in which case the alpha data represent the opacity or transparency of the input video data in a video composition process.

The apparatus may also include a memory operatively coupled to the feature extraction unit. The feature extraction unit may then be operable to extract the feature data by generating a weight for a pixel of the input video data; accumulating the weight from each pixel; accumulating a resultant value of the weight multiplied with the input video data at each pixel to be processed; storing the accumulated weight in the memory; and storing the accumulated resultant value.

Still other aspects, features, and advantages of the present invention will be readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
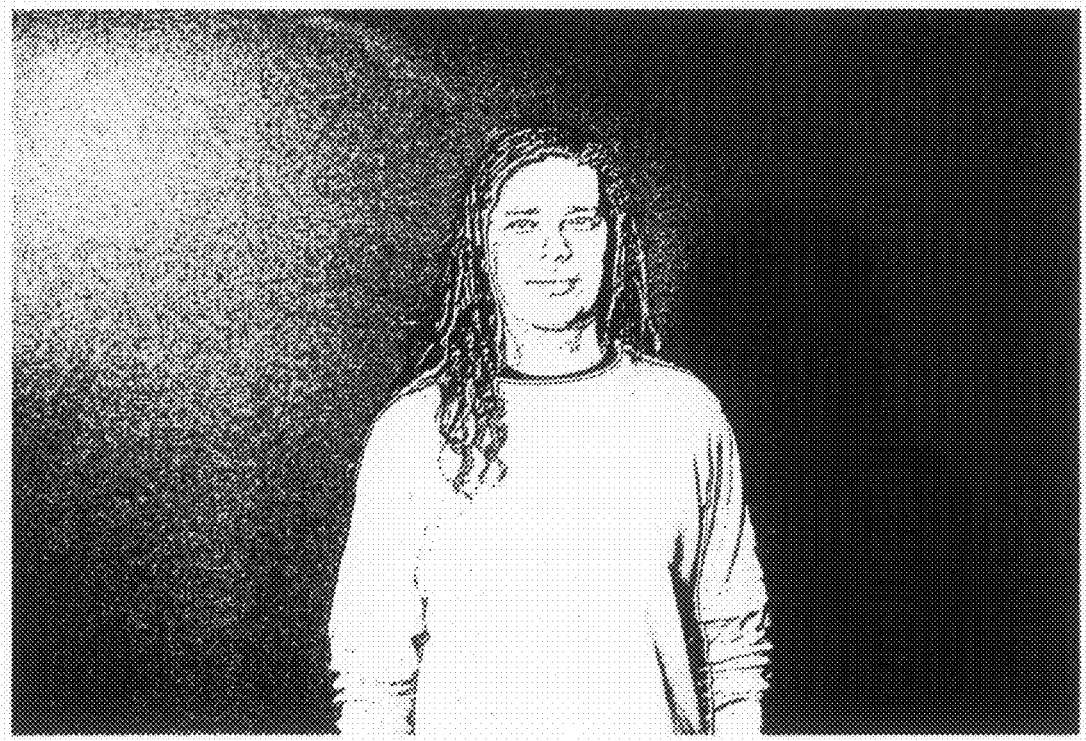
FIG. 1 illustrates a picture shot in a studio for describing a chromakey function.

Referring now to the drawings, FIGS. 1-20 are used to describe a method, system and device of dynamic data correction for non-uniformity in live video composition. For purposes of explanation, numerous specific details are set forth in order to provide a thorough understanding of the present invention. It will be apparent to one skilled in the art, however, that the present invention can be practiced without these specific details or with equivalent arrangements. In some instances, structures and devices are shown in block diagram form in order to avoid unnecessarily obscuring the present invention.

Figure 2:
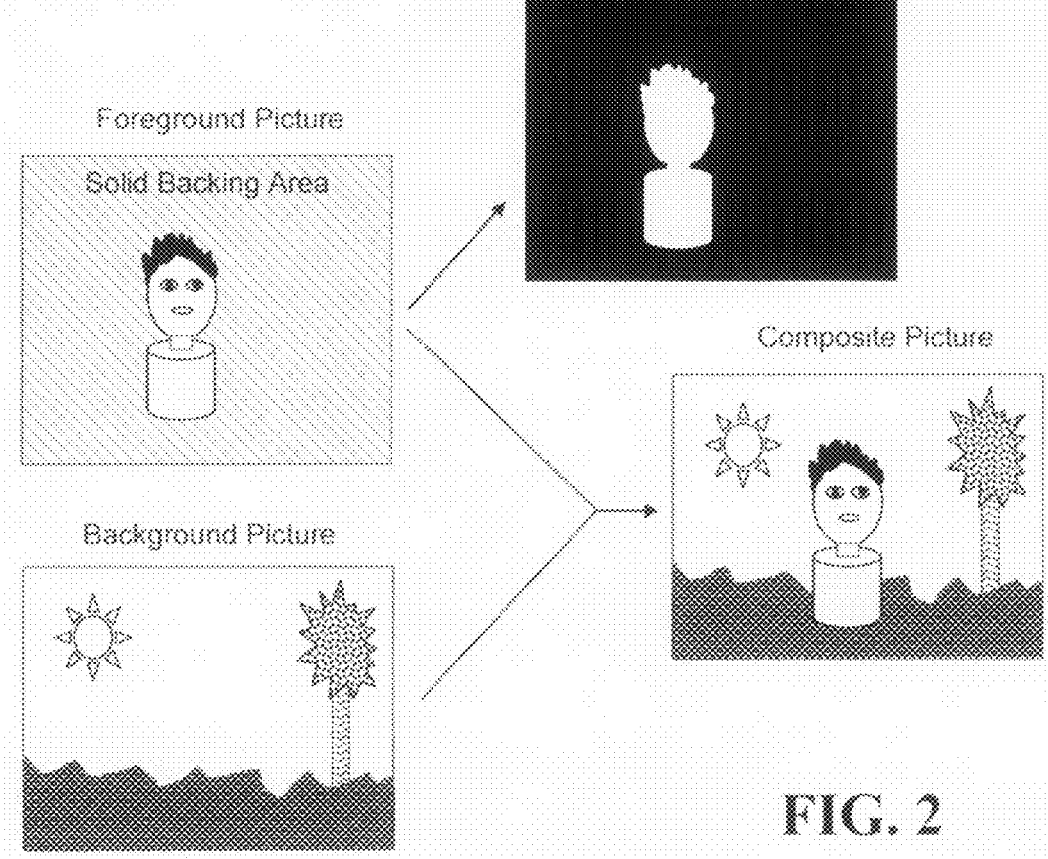
FIG. 2 illustrates a procedure of linear video composition.

While the term and technique of video data correction are widely mentioned and used in video display devices, such as plasma, LCD, other projector devices, and the like, for example, as in references [1][2][3], the exemplary embodiments employ this term and general procedure to represent a technique and method which can improve the video quality in a live video composition. In order to easily understand the applications of the exemplary embodiments, FIG. 1 shows a picture shot in a live video studio where a character is positioned in front of a solid color wall, such as green wall or blue wall. Video composition superposes this picture on a new background by cutting the solid backing color area off and replacing it with the new background picture content, as shown in FIG. 2.

As previously described, the process of cutting the backing color off a foreground picture is called a chromakey process or a chromakey function in a live video composition. This process normally generates a signal called an alpha signal or an alpha channel, which identifies various areas on the foreground picture with values ranging from 0 to 1. For example, a value of 1 can be used to indicate a foreground object, a value of 0 can be used to indicate a backing area, and a value of 0.5 can be used to indicate semitransparent objects on the foreground. This alpha signal is also used to represent the transparency or opacity of the foreground picture when overlaid on the new background picture.

Embodiments of the present invention may include recognition that one of the problems that arises when removing the solid backing color and generating the alpha channel is that a non-uniform backing color increases the difficulty for a chromakey function or device to not only clean up the backing color, but also preserve the foreground object details. A non-uniform backing color may arise due to reflection from a non-uniform backdrop or bumpy wall, for example. A real lighting system also casts non-uniform lights. Although most resultant pictures look flat and uniform on the backing area, actual waveforms of video signals still show obvious curves along the horizontal scan direction and vertical scan direction, which can cause general chromakey devices to malfunction.

Figure 3:
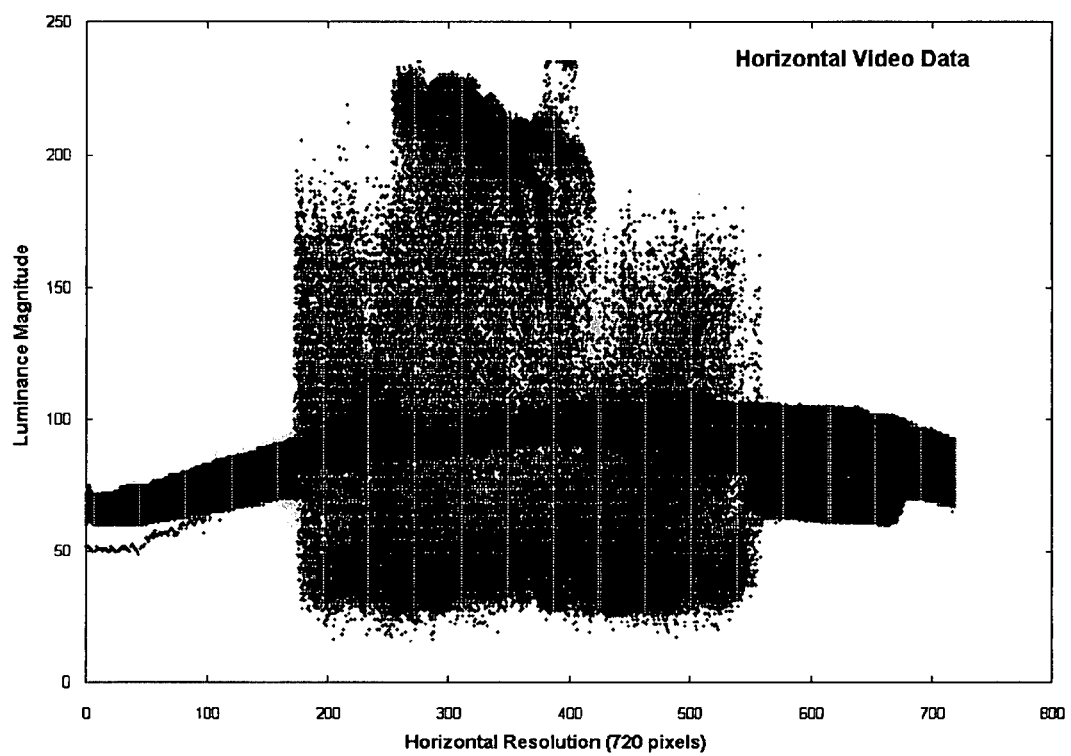
FIG. 3 illustrates a plot of a waveform of a video luminance signal along a horizontal scan order.
Figure 4:
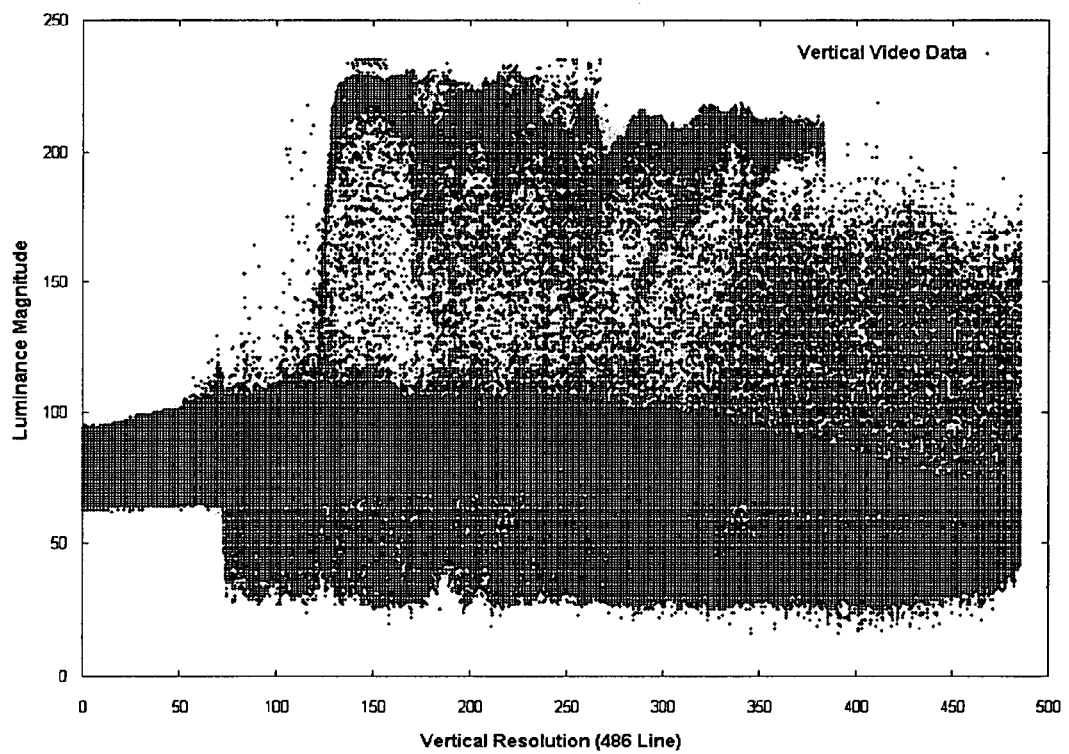
FIG. 4 illustrates a plot of a waveform of a video luminance signal along the vertical scan order.

FIG. 3 and FIG. 4 plot real waveforms of a horizontal luminance signal and a vertical luminance signal from repeated scanning, respectively, specifically when video data from a picture such as shown in FIG. 1 is applied to an oscilloscope for waveform display. It will be apparent from FIGS. 3 and 4 that both horizontal and vertical waveforms show a clear pattern and trend of parabolic curves across the entire picture, which is the non-uniformity caused by the lighting system. A straightforward improvement is to correct the curved waveforms into straight lines, horizontally and vertically.

In theory, data correction is a general technique that can be applied, for example, when the acquisition of a physical property with a physical sensor produces flawed data, which deviate from an ideal or theoretic model due to imperfections of the sensor. Such a technique is most commonly used in the industry of imaging, referred to as shading correction [4]. Some recent techniques are found in references [5][6]. In these applications, shading patterns are completely static, so that they can be pre-determined.

Figure 5:
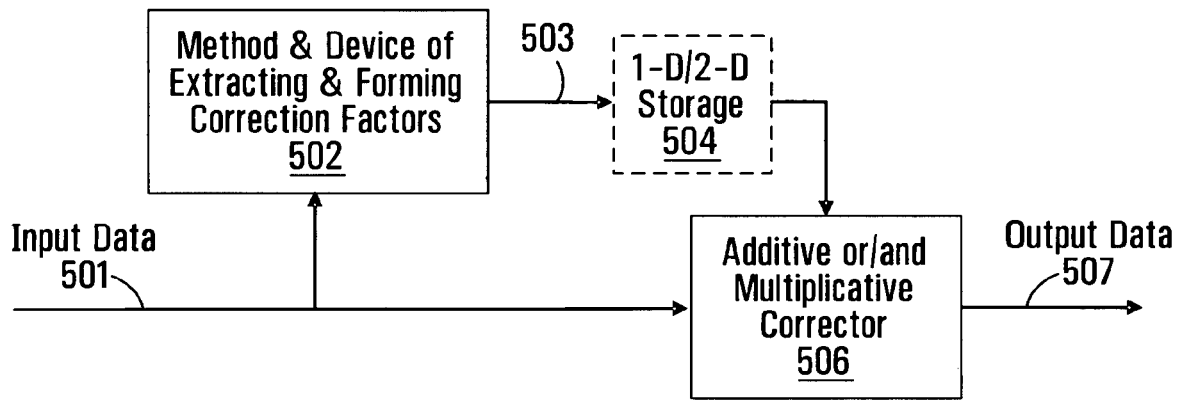
FIG. 5 illustrates a device and general procedure for data correction.

For example, FIG. 5 shows a device and general procedure for data correction. In FIG. 5, element 502 is the generator of correction factors, which normally compares input data 501 with standard data and then uses the difference to form a correction pattern. The correction pattern or correction factors 503 are stored in a memory 504 for correction of the flawed input data 501. If the input data 501 are two-dimensional (2D) data, such as video data, the memory size normally accommodates a 2D array. Correction is implemented in corrector 506, either by adding correction factors to input data 501 or by multiplying correction factors with input data 501, or by the combination of additive and multiplicative processes. After the additive and/or multiplicative processes, corrected data are output as shown at 507.

Figure 6:
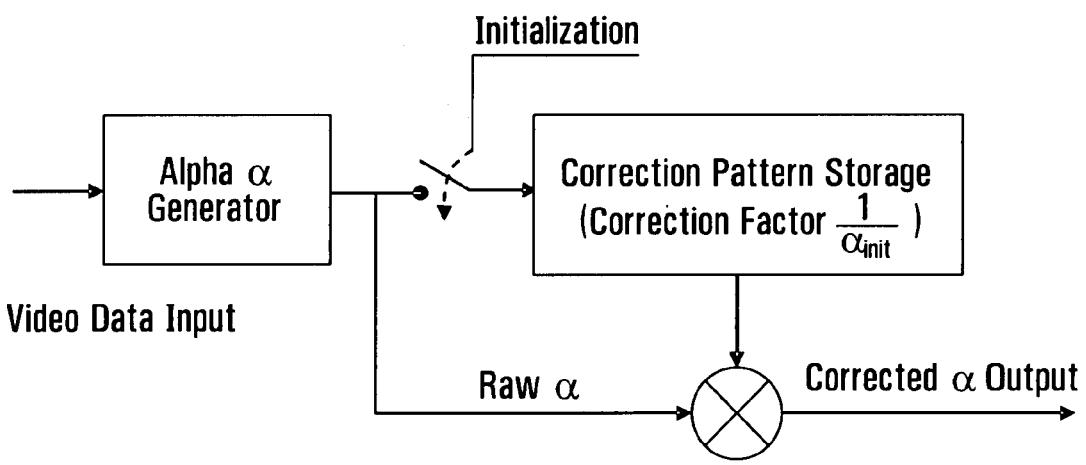
FIG. 6 illustrates a known device and procedure for correction and compensation of non-uniform backing area for image composition.

As an example of data correction applied to image composition, as used in reference with [7], FIG. 6 illustrates a known device and technique for data correction and compensation of non-uniform backing color for image composition. The basic idea is to store the reciprocal of an alpha signal generated from a non-uniform backing area during an initialization stage. This alpha signal can be labeled as $\alpha_{init}$, which is distinguished from an $\alpha$ produced on air. In other words, the correction factor is directly proportional to $\alpha_{init}^{-1}$, and the correction pattern is two-dimensional. The main advantage of this method is that it is capable of correcting various types of flaws, such as seams, brim, wrinkles, and dirt marks on the back walls or backdrops. Aspects of the present invention include recognition of the disadvantages of such techniques, for example, including:

(1) Only dealing with static cameras' shots. For example, movement from a camera, such as pan/zoom/shift or a change from a lighting system, even a vibration, can cause failures with such methods.

(2) Lack of immunity from noise. This is because normally the correction pattern storage captures individual and independent pixel data from a single field or frame rather than a statistical average, such as an accumulated value from multiple frames.

(3) Loss of precision due to changes. The correction pattern is generated by removing foreground objects out of a scene and comparing the bare backing area with a reference constant. When the foreground objects move into the scene, the brightness from backing reflection normally changes because the foreground objects disturb the environmental brightness. Therefore, the stored pattern looses its precision.

(4) In theory, the correction factor $\alpha_{init}^{-1}$ not only corrects backing area to generate uniform $\alpha$, but also corrects any transition area where $\alpha$ is not zero.

The following description includes an exemplary method of data correction for non-uniformity in live video data, and with a strict mathematical style for certainty, and as elaborated by exemplary embodiments of the implementation. Accordingly, the exemplary embodiments include an innovative method, system and device to solve at least some of the above-noted problems and possibly other problems with conventional approaches for data correction for non-uniformity in live video composition.

Figure 7:
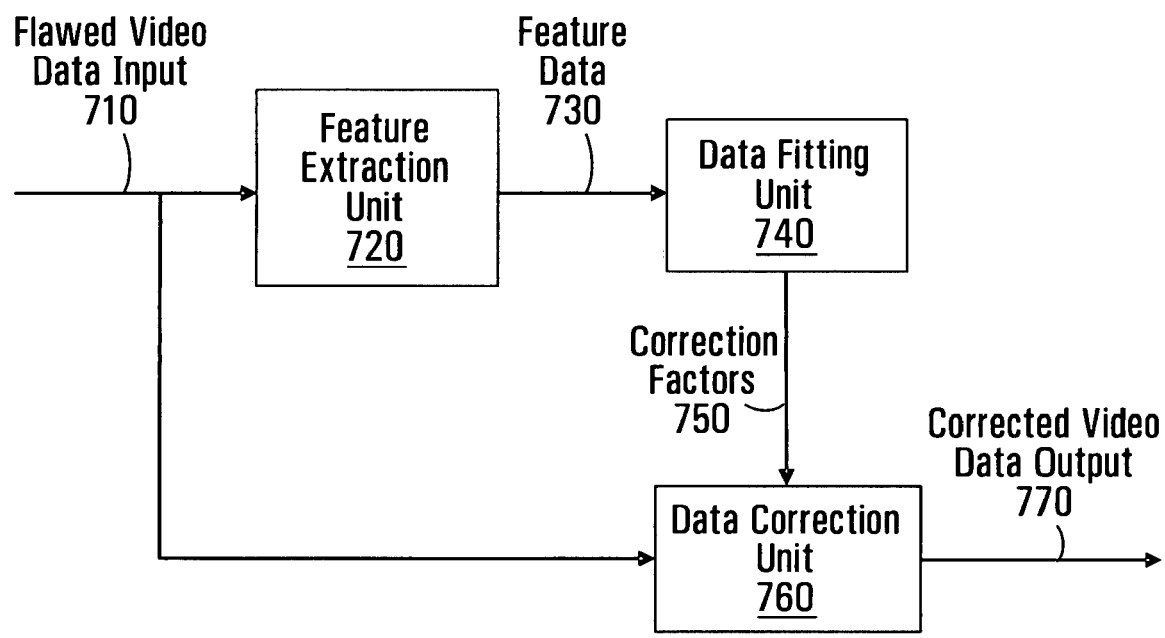
FIG. 7 illustrates a block diagram of an exemplary device and method for dynamic data correction.

For example, FIG. 7 illustrates an exemplary device and method for data correction, according to an exemplary embodiment. In FIG. 7, feature data 730 is extracted from flawed live video signals 710 by a feature extraction unit 720, and then the extracted feature data 730 is used by a data fitting unit 740 to construct correction factors 750 by fitting the feature data 730 into a model of curves with continuity of high order of directives. Finally, the correction factors 750 or fitting model is fed into a correction unit 760, where the flawed live video signals 710 are corrected and output as corrected video data 770.

Feature Extraction from Mass Data

Referring back to FIG. 3 and FIG. 4, these Figures are plots of video luminance data along the horizontal scan order and the vertical scan order, respectively. The two plots show a clear pattern of parabolic curves across the picture in both scan directions. Such curves are the features that depict the non-uniformity in the video data and which can be extracted. Accordingly, the following sections describe an exemplary feature extraction process that might be implemented by a feature extraction unit such as 720 (FIG. 7).

For example, let us assume that a coordinate (i, j) is a pair of row and column numbers, that a pixel located at (i, j) has data $f(i, j)$, which can be any of color components as shown in Table 1, and that there exists a weight function w(i, j) in terms of pixel location (i, j), which is used to qualify the contribution of each pixel to the non-uniformity feature of video data. In an exemplary embodiment, the video feature is equivalent to the statistical mean of data by accumulating weighted video data $f(i, j)$, horizontally and vertically, respectively.

TABLE 1

Components of various color space.

| Color Space | Primary Components | | |
|---|---|---|---|
| CIE $YC_rC_b$ | Y: luminance | $C_r$: red color difference | $C_b$: blue color difference |
| CIE RGB | R: red primary color | G: green primary color | B: blue primary color |
| HSL | L: luminance | H: hue | S: saturation |
| HSV/HSB | V: brightness | H: hue | S: saturation |
| CYMK | C: cyan color | Y: yellow color | M: magenta |
| YUV | Y: luminance | U: modified blue difference | V: modified red difference |
| YIQ | Y: luminance | I: modified red difference | Q: modified blue difference |

First, horizontal accumulation is implemented for each row, for example, at row i, as given by:

$$f_{acc}^h(i) = \sum_j f(i, j)w(i, j), \quad (1)$$

$$w_{acc}^h(i) = \sum_j w(i, j). \quad (2)$$

Then, the average data at row i is given by:

$$f_{avg}^h(i) = \frac{f_{acc}^h(i)}{w_{acc}^h(i)}. \quad (3)$$

Similarly, vertical accumulation is implemented for each column, for example, at column j, as given by:

$$f_{acc}^v(j) = \sum_i f(i, j)w(i, j), \quad (4)$$

$$w_{acc}^v(j) = \sum_i w(i, j). \quad (5)$$

Then, average data at column j is $f_{avg}^v(j)$, as given by:

$$f_{avg}^v(j) = \frac{f_{acc}^v(j)}{w_{acc}^v(j)}. \quad (6)$$

The pair $\{f_{avg}^h(i), w_{acc}^h(i)\}$ from horizontal accumulation is used for vertical data fitting, and the pair $\{f_{avg}^v(j), w_{acc}^v(j)\}$ from vertical accumulation is used for horizontal data fitting.

Model Fitting into Extracted Feature

Generally, many types of curves can be used to model the feature data. For example, a data fitting step could use either a single high-order polynomial or multiple high-order polynomials which are smoothly connected to form splines. However, in exemplary embodiments, an L-order polynomial is employed, which is defined by:

$$g(x) = \sum_{k=0}^{L} c_k x^k. \tag{7}$$

A sum of weighted square errors can be defined as:

$$E = \sum_{x} w_{acc}(x)(g(x) - f_{avg}(x))^2. \tag{8}$$

Then, by minimizing the sum of weighted square errors, the (L+1) coefficients of L-order polynomial can be found as:

$$(c_0, c_1, c_2, \ldots, c_L) = \arg\min_{(c_0, c_1, \ldots, c_L)} \{E\}. \tag{9}$$

For example, if the horizontal average video data is fitted into M-order polynomial $g^h(j)$, error $E_h$ can be defined by a difference between the fitting model and the real average data from the vertical accumulation, as given by:

$$E_h = \sum_j w_{acc}^v(j)(g^h(j) - f_{avg}^v(j))^2, \tag{10}$$

$$= \sum_j w_{acc}^v(j) \left( \sum_k c_k^h j^k - f_{avg}^v(j) \right)^2.$$

By minimizing $E_h$, a vector of (M+1) coefficients is found as:

$$\begin{bmatrix} c_0^h \\ c_1^h \\ \ldots \\ c_M^h \end{bmatrix} = \begin{bmatrix} A_0^h & A_1^h & \cdots & A_M^h \\ A_1^h & A_2^h & \cdots & A_{M+1}^h \\ \cdots & \cdots & \cdots & \cdots \\ A_M^h & A_{M+1}^h & \cdots & A_{2M}^h \end{bmatrix}^{-1} \begin{bmatrix} B_0^h \\ B_1^h \\ \ldots \\ B_M^h \end{bmatrix}, \tag{11}$$

where:

$$A_k^h = \sum_j w_{acc}^v(j) j^k, k = 0, 1, \ldots, M \tag{12}$$

and $$B_k^h = \sum_j w_{acc}^v(j) f_{avg}^v(j) j^k, k = 0, 1, \ldots, M. \tag{13}$$

The above derivation is further described in detail below.

Similar to the horizontal fitting, if the vertical average video data is fitted into N-order polynomial $g^v(i)$, an error $E_v$ represents a difference between the fitting model and the real average data from the horizontal accumulation, an error $E_v$ can be given by:

$$E_v = \sum_i w_{acc}^h(i)(g^v(i) - f_{avg}^h(i))^2, \tag{14}$$

$$= \sum_i w_{acc}^h(i) \left( \sum_k c_k^v i^k - f_{avg}^h(i) \right)^2.$$

By minimizing $E_v$, a vector of (N+1) coefficients is found as:

$$\begin{bmatrix} c_0^v \\ c_1^v \\ \ldots \\ c_N^v \end{bmatrix} = \begin{bmatrix} A_0^v & A_1^v & \cdots & A_N^v \\ A_1^v & A_2^v & \cdots & A_{N+1}^v \\ \cdots & \cdots & \cdots & \cdots \\ A_N^v & A_{N+1}^v & \cdots & A_{2N}^v \end{bmatrix}^{-1} \begin{bmatrix} B_0^v \\ B_1^v \\ \ldots \\ B_N^v \end{bmatrix}, \tag{15}$$

where:

$$A_k^v = \sum_i w_{acc}^h(i) i^k, k = 0, 1, \ldots, N, \tag{16}$$

and $$B_k^v = \sum_i w_{acc}^h(i) f_{avg}^h(i) i^k, k = 0, 1, \ldots, N. \tag{17}$$

Construction of Correction Factors

Multiplicative correction factors can be defined by reciprocating fitting models. For example, a possible horizontal multiplicative correction factor is given by:

$$C_{mult}^h(j) = \frac{d^h}{g^h(j)} = \frac{d^h}{\sum_{k=0}^{M} c_k^h j^k}, \tag{18}$$

and a vertical multiplicative correction factor is given by:

$$C_{mult}^v(i) = \frac{d^v}{g^v(i)} = \frac{d^v}{\sum_{k=0}^{N} c_k^v i^k}, \tag{19}$$

where $d^h$ and $d^v$ are constants, depending on a real implementation. Several possible formulas for $d^h$ or $d^v$ are listed in Table 2. A reference backing color $f_{ref}$ is a constant represented in one of the color components listed in Table 1, corresponding to the type of video data to be accumulated, in some embodiments. This reference $f_{ref}$ can be obtained, for example, from one of the following methods: 1) a reference backing color chosen by a user, from pictures to be processed, by means of a GUI (Graphical User Interface), and 2) a reference backing color automatically generated by a method, such as previously described. In one possible implementation, a frame grabber stores and displays input video data, and a user can use a GUI to select a reference backing color in the frame grabber.

Table 2 possibly used formulas for constant d.

| Method & Explanation | d = function($g_{max}$, $g_{min}$, $f_{ref}$) |
|---|---|
| Average the reference backing color and maximum and minimum data | $\dfrac{2g_{max} + g_{min} + f_{ref}}{4}$ |
| Center around reference backing color and compensate for deviation from it | $\dfrac{g_{max} + g_{min} + f_{ref}}{4}$ |
| Center around average | $\dfrac{g_{max} + g_{min} + f_{ref}}{3}$ |
| Suppress lightest area and illuminate darkest area | $\dfrac{g_{max} + g_{min}}{2}$ |
| Center around reference only | $f_{ref}$ |
| Illuminate all dark area and keep bright area unchanged but likely scale up the noise | $g_{max}$ |
| Suppress all lightest area and keep dark area unchanged, but likely scale down the noise | $g_{min}$ |

An additive correction factor can be defined by a difference between a standard reference and the fitting model. For example, a horizontal additive correction factor can be defined as:

$$C_{add}^h(j) = d^h - g^h(j), \quad (20)$$

and a vertical additive correction factor can be defined as:

$$C_{add}^v(i) = d^v - g^v(i). \quad (21)$$

The above additive correction factors generally would not be used together. This is in contract with multiplicative corrective factors. Alternatively, a combined additive correction factor can be defined as:

$$C_{add}^{hv} = d^{hv}\left(1 - \frac{g^v(i)g^h(j)}{d^v d^h}\right) \quad (22)$$

where $d^{hv}$ is a constant that may be determined using one of the formulas listed in Table 3, for example.

Table 3 constant for combined additive correction factor.

| Method & Explanation | $d^{hv}$ |
|---|---|
| Horizontal style | $d^h$ |
| Vertical style | $d^v$ |
| Average style | $\dfrac{d^h + d^v}{2}$ |
| Reference style | $f_{ref}$ |

Correction of Non-Uniform Luminance & Chrominance

The correction is implemented as either multiplicative correction, additive correction, or a combination of additive and multiplicative corrections. In accordance with the above examples, a multiplicative correction is defined by:

$$f'(i,j) = f(i,j) * C_{mult}^v(i) * C_{mult}^h(j), \quad (23)$$

an additive correction is defined by:

$$f'(i,j) = f(i,j) + C_{add}^{hv}(i,j), \text{ and} \quad (24)$$

a combined correction is defined by combining $C_{mult}^v(i)$, $C_{mult}^h(j)$, $C_{add}^v(i)$, $C_{add}^h(j)$. Some exemplary combinations are listed in Table 4.

TABLE 4 combined correction method.

| Method & Explanation | f'(i, j) |
|---|---|
| Adds offset horizontally then modulates vertically. | $(f(i, j) + C_{add}^h(j)) \times C_{mult}^v(i)$ |
| Adds offset vertically then modulates horizontally. | $(f(i, j) + C_{add}^v(i)) \times C_{mult}^h(j)$ |
| Modulates vertically then adds offset horizontally | $f(i, j) \times C_{mult}^v(i) + C_{add}^h(j)$ |
| Modulates horizontally then adds offset vertically | $f(i, j) \times C_{mult}^h(j) + C_{add}^v(i)$ |

Embodiments & Applications

One of the exemplary embodiments is to use a rough alpha as a weight, as previously described and then used through the exemplary methods. The concept of rough alpha or "dirty alpha" was previously described, and first introduced in the above-referenced co-pending U.S. patent application Ser. No. 11/072,502. For example, the rough alpha can be generated by any one of the following methods:

1) a low-cost, low-precision and low-quality, but full-level alpha generator, wherein normally an 8-bit color component, or 255 levels, is sufficient for the human visual system, high quality systems at present may offer a 10-bit color component, or 1023 levels, and even higher levels including a 12-bit color component, or 4095 levels;

2) an intermediate result from a high-cost, high-precision, high-quality alpha generator;

3) a hard-switching between foreground and backing area so that only 0 and 1 are used as an alpha output and without transition details across them; or 4) a very finite level of alpha value, such as 4 or 16 levels.

Figure 8:
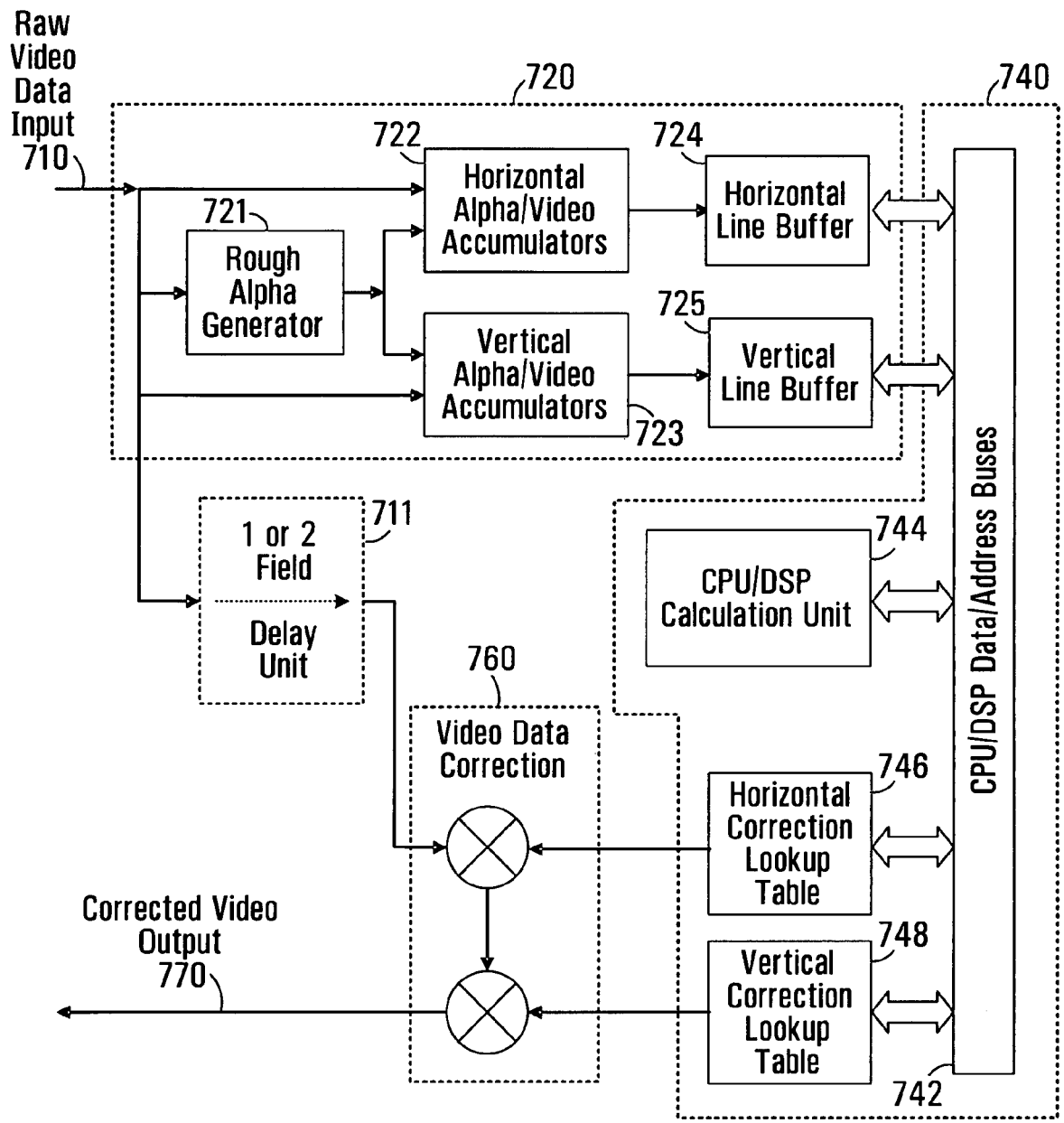
FIG. 8 illustrates an exemplary detailed block diagram for the exemplary device and method for dynamic data correction of FIG. 7.

FIG. 8 is an exemplary embodiment, which embodies FIG. 7 and implements equation 1 through equation 24. In FIG. 8, raw video data 710 is fed into a rough alpha generator 721 to form a low-precision alpha. The rough alpha weights the raw video data 710 and accumulates through Alpha/Video accumulators 722/723, vertically and horizontally, respectively. The horizontal line buffer 724 and vertical line buffer 725 store the accumulated data through one field or frame of video data. Then, the calculation unit 744 uses the accumulated data to generate the fitting curve and form the correction factors. The correction factors are sampled on a pixel by pixel basis and stored in the horizontal correction lookup table 746 and the vertical correction lookup table 748. Finally, raw video data 710, through a delay unit 711 to match the timing, are corrected at 760 and corrected data are output as shown at 770. The delay unit 711 need not necessarily be employed in all embodiments, depending on the application.

Figure 9:
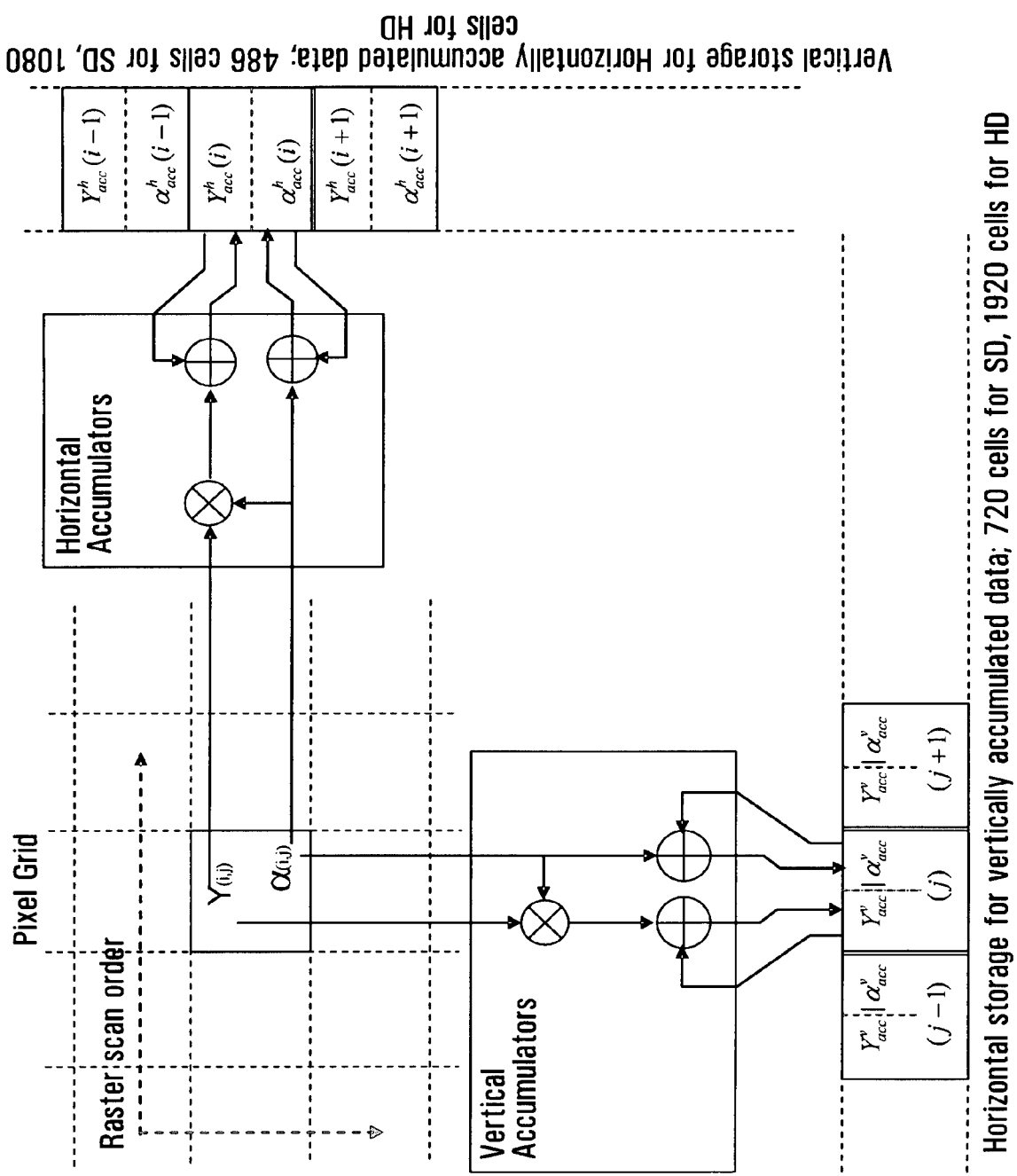
FIG. 9 illustrates an exemplary implementation and processing flows for vertical and horizontal accumulation.

FIG. 9 further elaborates on an exemplary implementation of the feature extraction unit 720 shown in FIG. 7 and FIG. 8. The rough alpha is shown in FIG. 9 as α(i, j) and the raw video data is shown as video luminance Y(i, j). FIG. 9 shows examples for Standard Definition (SD) and High Definition (HD) video.

Figure 10:
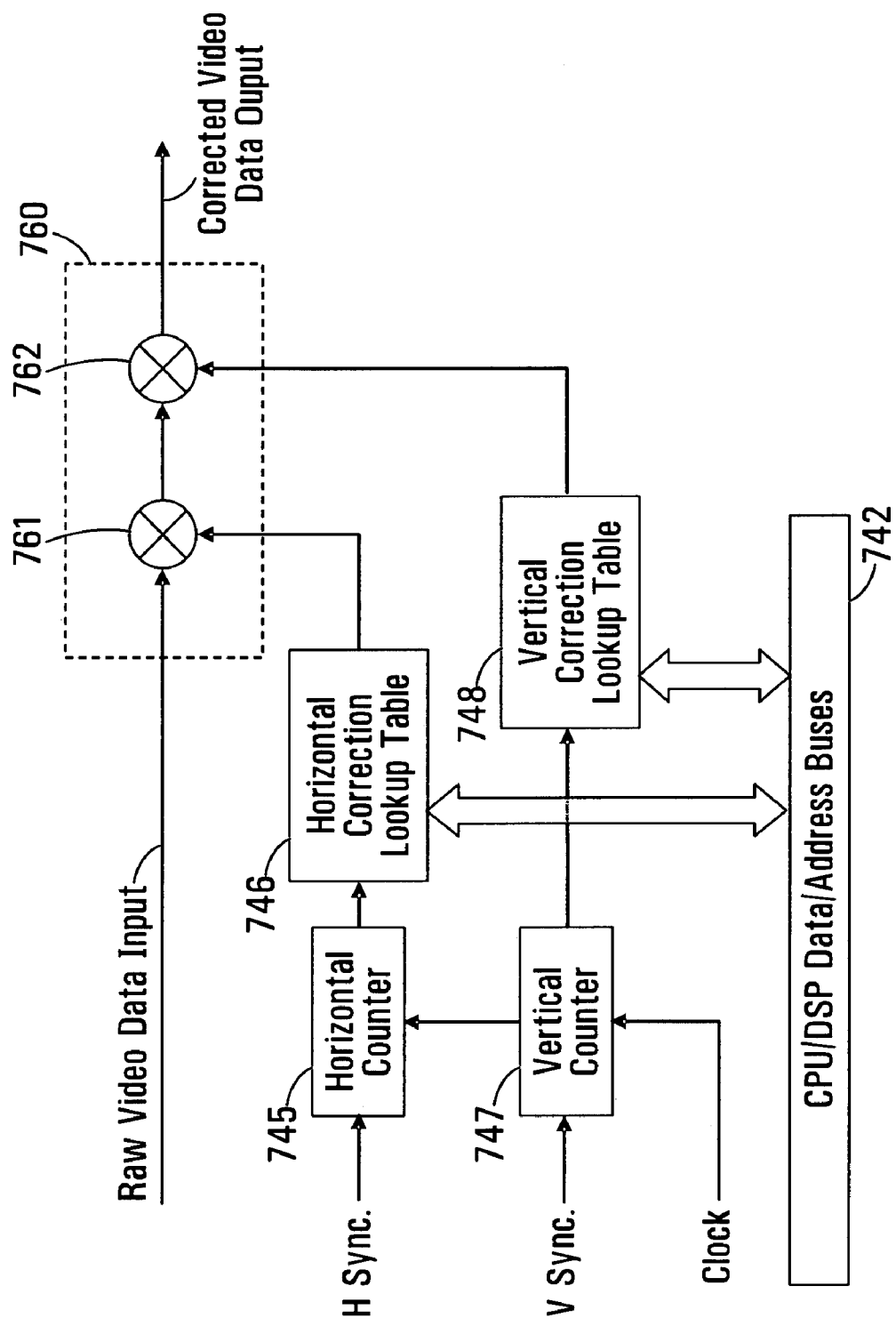
FIG. 10 illustrates an exemplary implementation of data correction.
Figure 11:
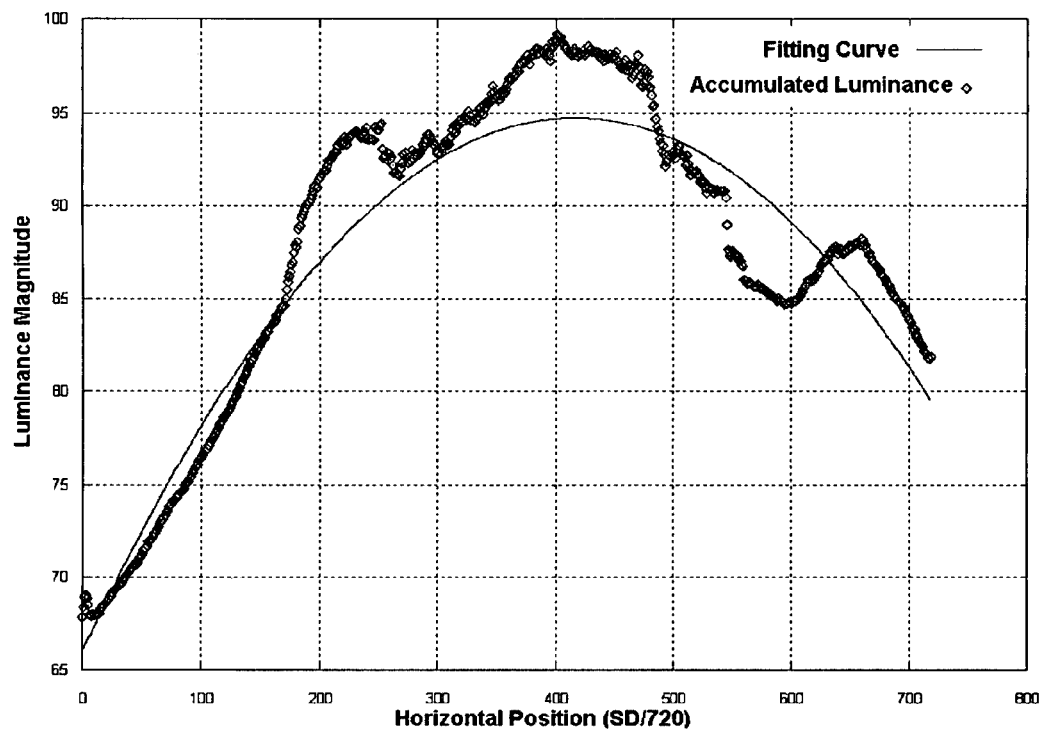
FIG. 11 illustrates a plot of an exemplary horizontal fitting curve and vertically accumulated luminance data.
Figure 12:
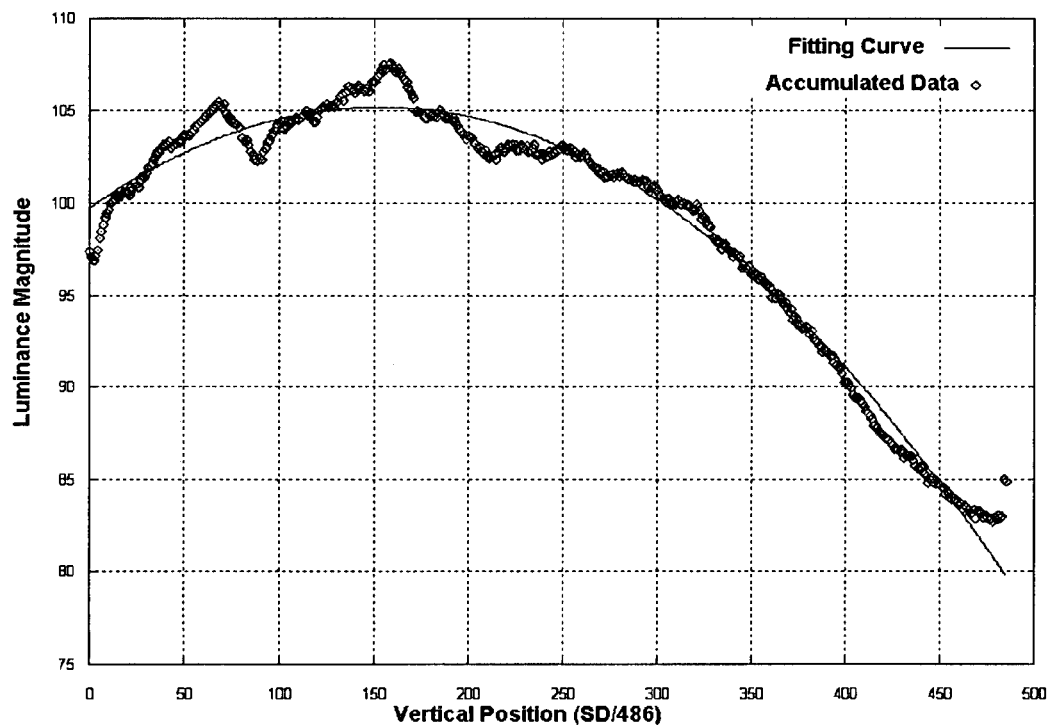
FIG. 12 illustrates a plot of an exemplary vertical fitting curve and horizontally accumulated luminance data.
Figure 13:
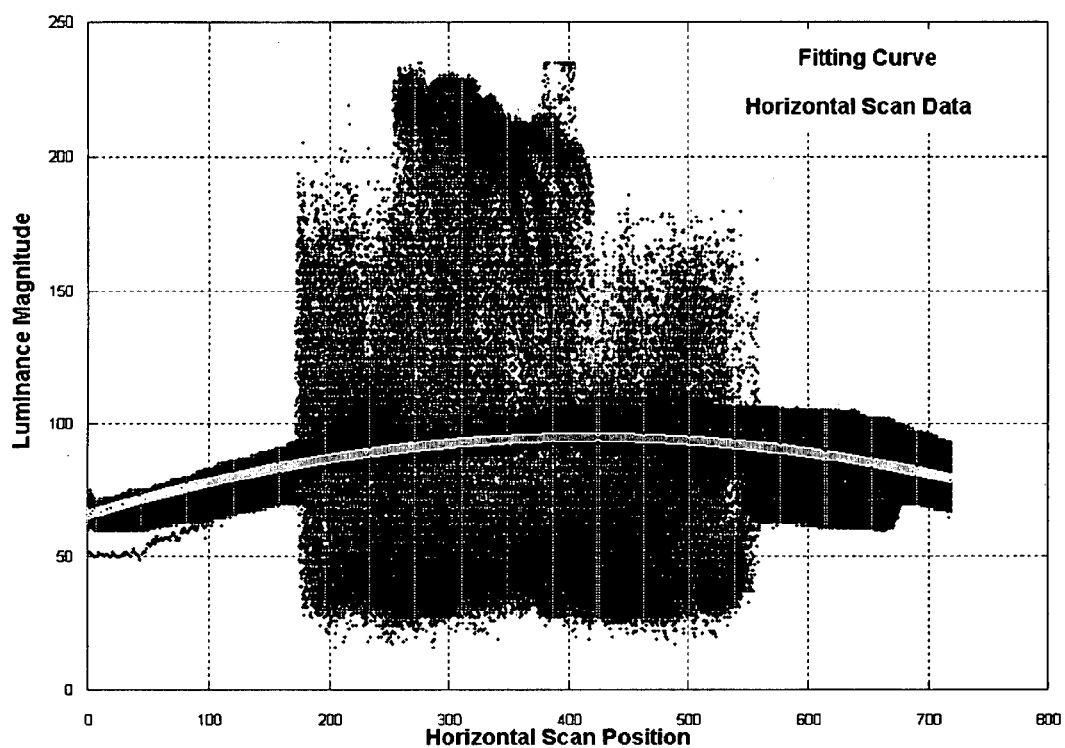
FIG. 13 illustrates a plot of an exemplary horizontal fitting curve and video luminance data along a horizontal scan order.
Figure 14:
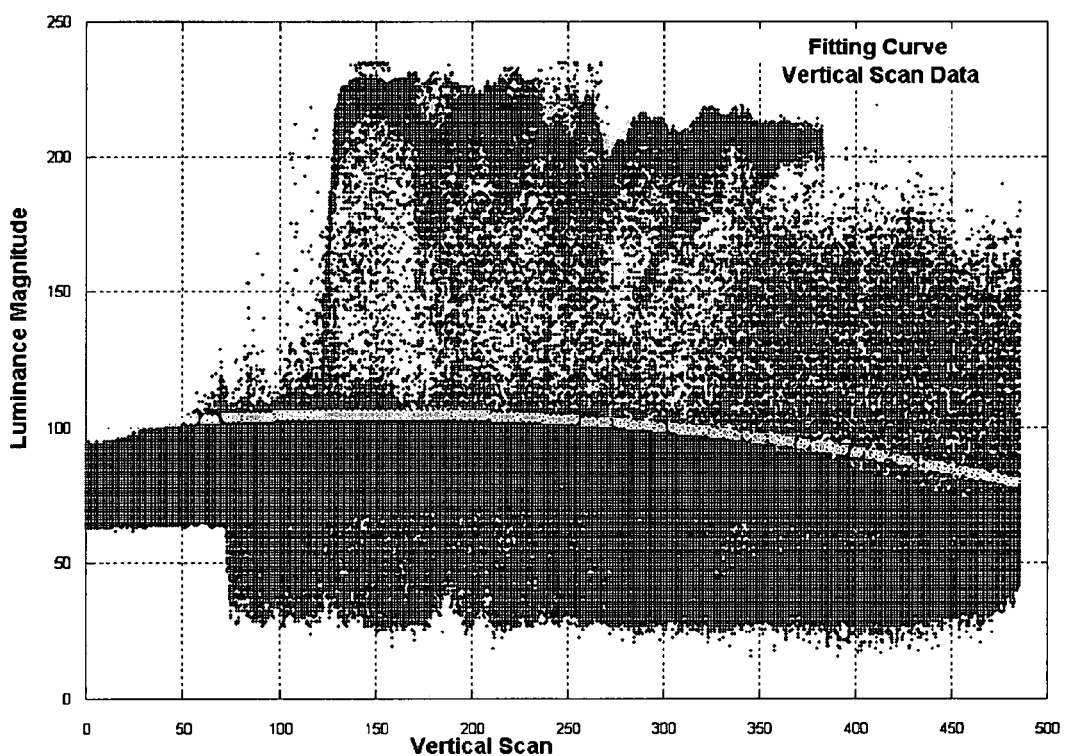
FIG. 14 illustrates a plot of an exemplary vertical fitting curve and video luminance data along a vertical scan order.

FIG. 10 further elaborates on an exemplary implementation of the data correction unit 760 shown in FIG. 7 and FIG. 8. In FIG. 10, multipliers 761 and 762 carry out a multiplicative correction by first applying a horizontal correction factor and then applying a vertical correction factor. The calculation unit 744 (FIG. 8) loads the lookup tables 746 and 748 through the bus 742. These two lookup tables are read out every field or frame, on a pixel by pixel basis by using the horizontal counter 745 to access the horizontal correction lookup table 746, and on a line by line basis by the vertical counter 747 to access the vertical correction lookup table 748.

The exemplary embodiment shown in FIG. 8 employs a digital signal processor (DSP) or central processing unit (CPU) component 744 to implement data fitting from equation 7 through equation 17, and also sampling the curves from equation 18 and equation 19 to form the contents of the lookup tables 746 and 748. However, the calculation of equations is not limited to the use of DSPs, or CPUs, and the techniques disclosed herein can be implemented by a dedicated hardware component(s), such as a multiplier/divider component, and the like, as will be appreciated by those skilled in the video processing arts. Other implementations are also possible, using software, hardware, firmware, or combinations thereof.

Figure 15:
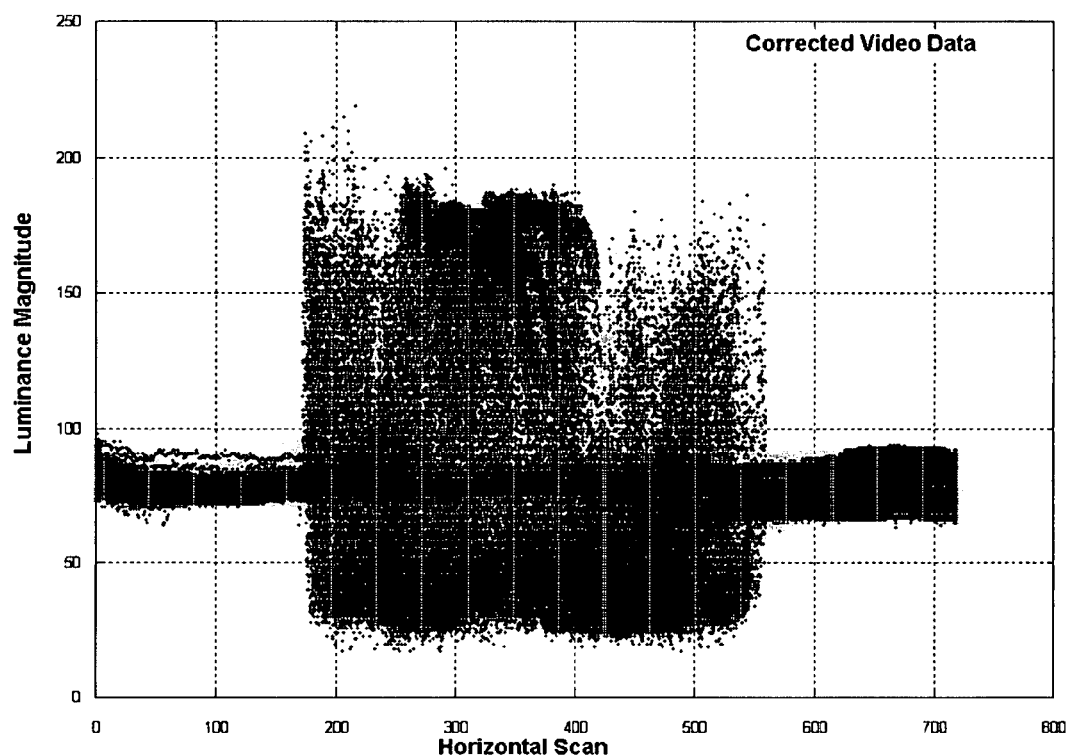
FIG. 15 illustrates a plot of an exemplary corrected luminance data along a horizontal scan order.
Figure 16:
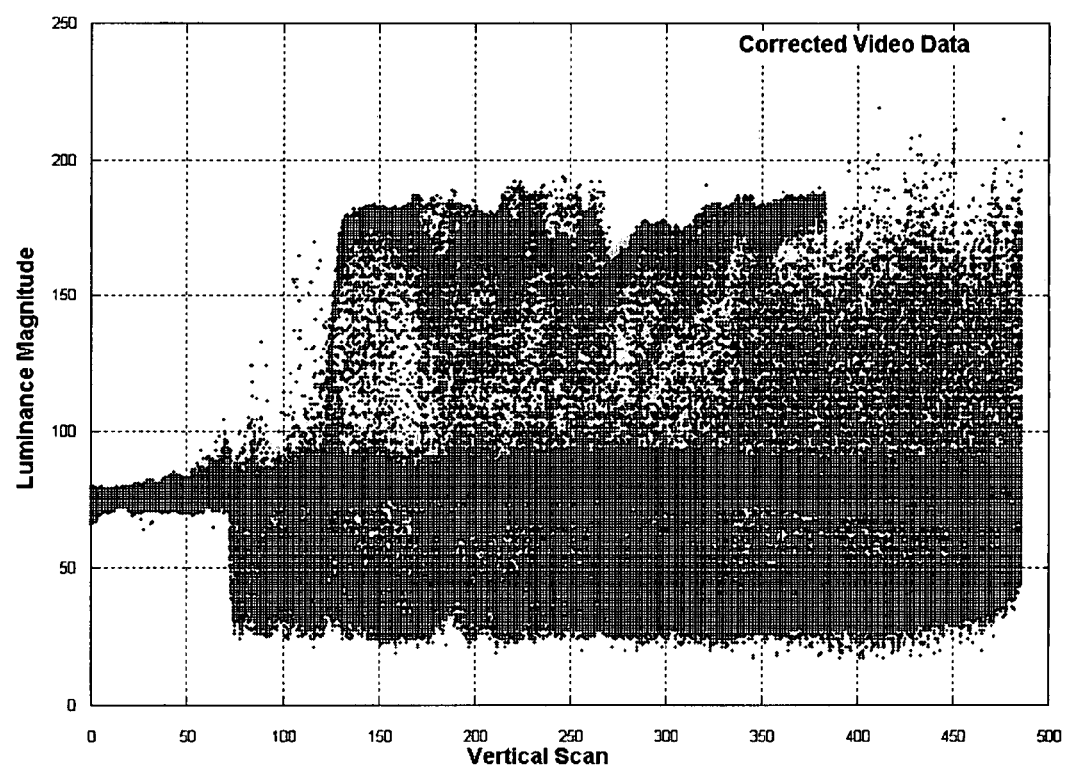
FIG. 16 illustrates a plot of an exemplary corrected luminance data along a vertical scan order.

In order to understand and prove how well embodiments of the present invention work, FIG. 11 through FIG. 14 illustrate plots of raw video luminance data versus fitting curves. The curves fitting into the feature data are constructed with 2nd-order polynomials, as previously described. Multiplicative correction is directly applied to video luminance, so as to correct the curved luminance data. The resultant data are shown in FIG. 15 and FIG. 16, plotted along the horizontal scan order and the vertical scan order, respectively. Advantageously, the original non-uniformity, which as noted above produces parabolic curves, is removed. This can be observed most clearly from a comparison of the plots in FIGS. 13 and 14 with those in FIGS. 15 and 16.

Other embodiments than those specifically described above are also possible. For example, if a video chrominance component is used as video input data, a feature extraction unit may determine the correction curve for the chrominance. By using the same correction method applied to video luminance, the non-uniformity in chrominance can also or instead be corrected.

Figure 17:
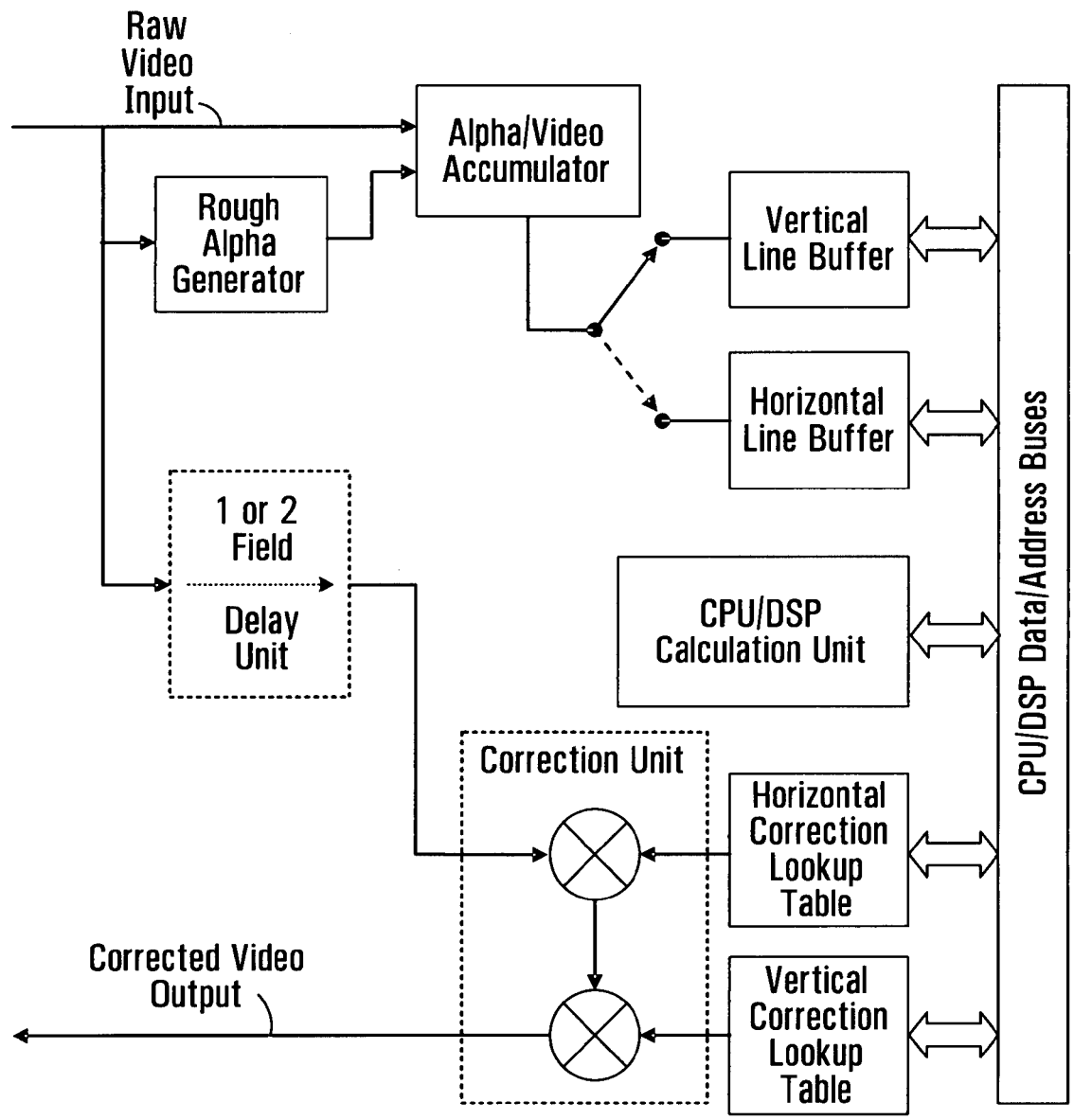
FIG. 17 illustrates a simplified version of the exemplary block diagram of FIG. 8.
Figure 18:
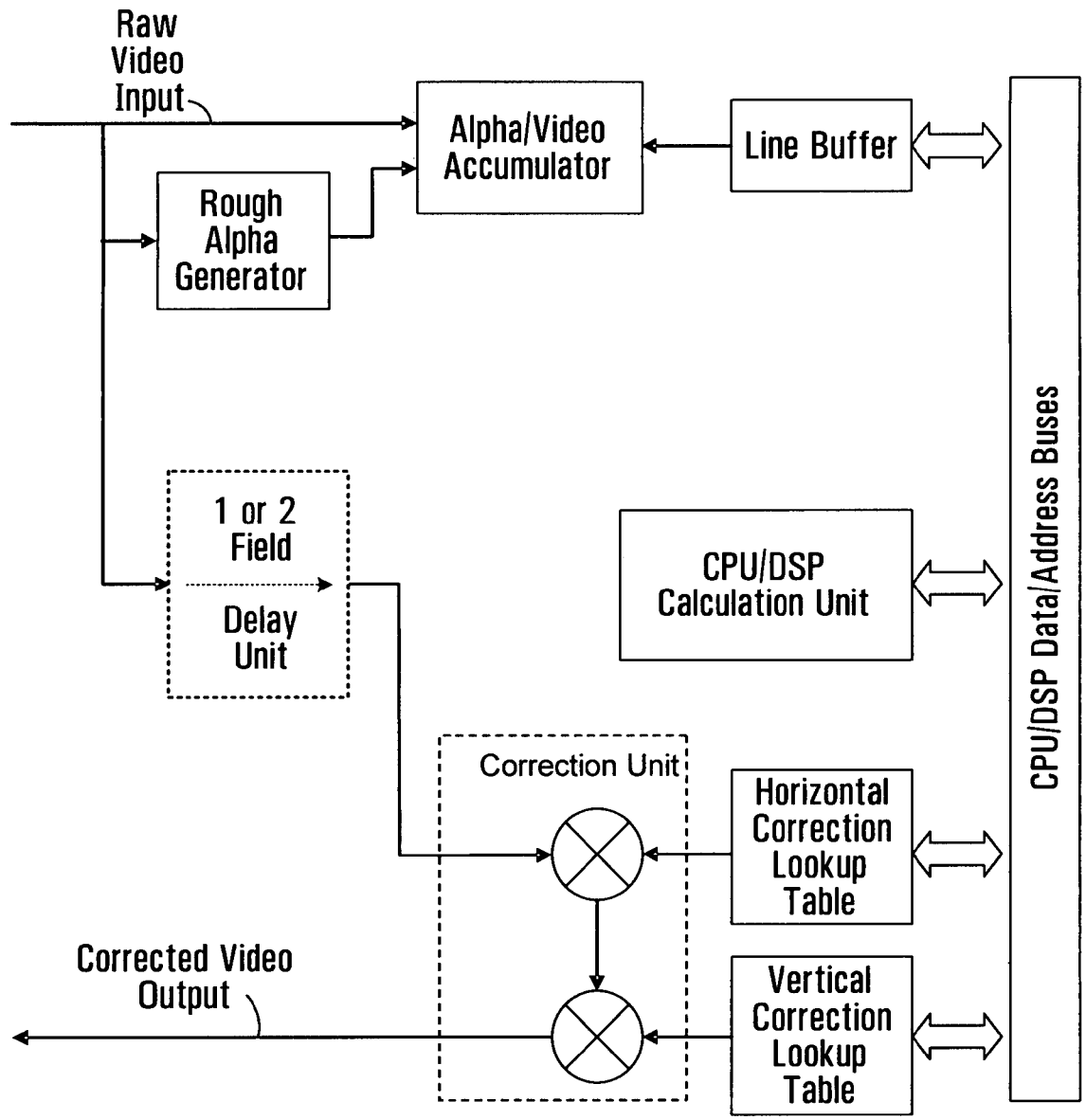
FIG. 18 illustrates a further simplified version of the exemplary block diagram of FIG. 8.

Another exemplary embodiment is to elaborate variations of implementation of FIG. 7, for example, as shown FIG. 8. In order to save resources in a given design, some of components can be repeatedly used and others can be removed. For example, FIG. 17 illustrates a single accumulator shared and multiplexed by horizontal and vertical line buffers. Performance is not degraded if this embodiment employs faster processing to alternatively switch the two data flows into a single accumulator. FIG. 18 employs a single accumulator and a single line buffer, so that the horizontal calculation and the vertical calculation are separately implemented in different fields or frames. With this embodiment, the performance may drop, for example, when lights and a camera move quickly, because the fitting curve might not be updated every field or frame.

Figure 19:
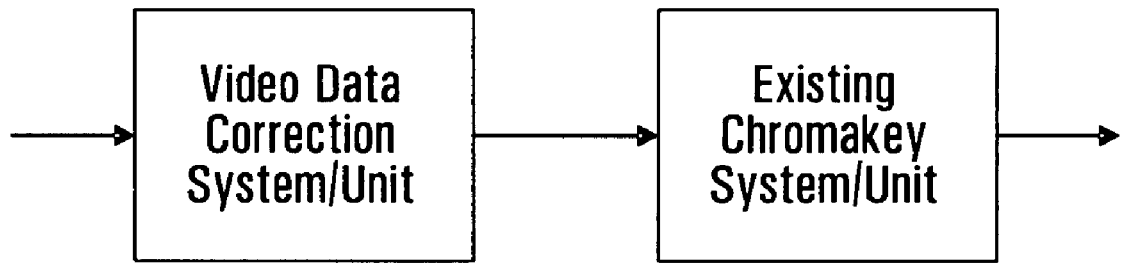
FIG. 19 illustrates an exemplary application that can be used in image composition.
Figure 20:
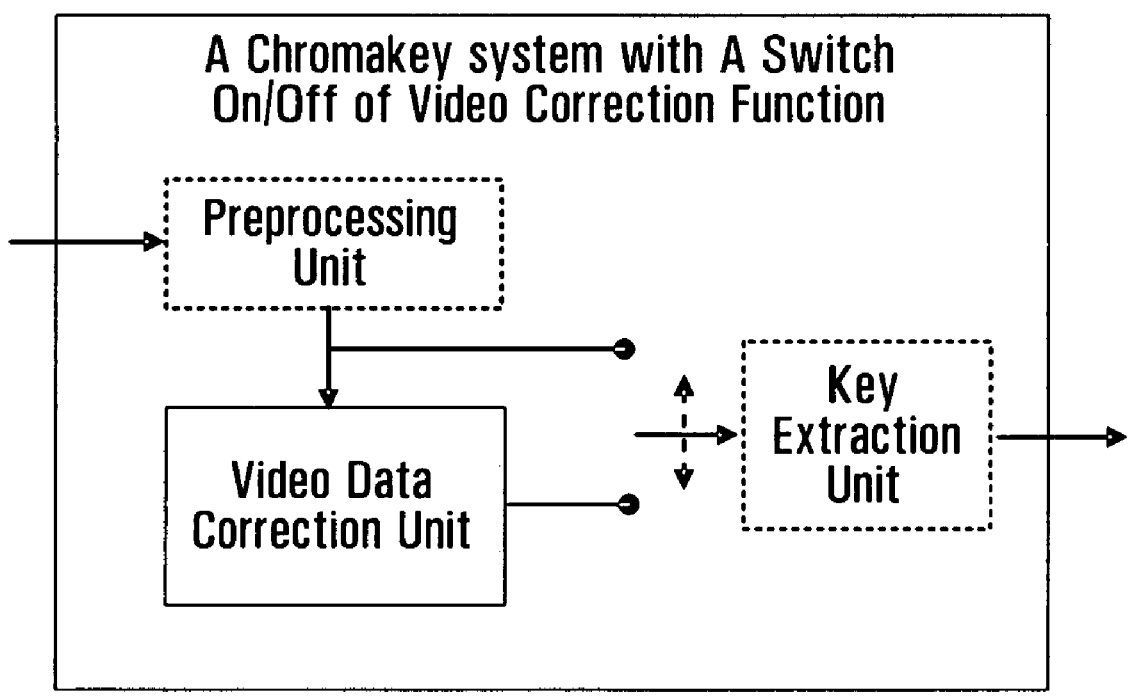
FIG. 20 illustrates another exemplary application that can be used in image composition.

Further exemplary embodiments also can include different techniques of combining data correction with a chromakey function in a system or a device. For example, FIG. 18 illustrates a further simplified version of the exemplary block diagram of FIG. 8;

FIG. 19 and FIG. 20 are used to describe two exemplary cases for respective applications. In the first case shown in FIG. 18 illustrates a further simplified version of the exemplary block diagram of FIG. 8;

FIG. 19, data correction is applied as an independent pre-processing system or unit before an existing chromakey system or unit. This case can improve the performance of the existing chromakey system or unit, advantageously, without a need for changing the chromakey system or unit. In the second case shown in FIG. 20, the exemplary data correction can be embedded in a chromakey design. As shown in FIG. 20, a switch can be inserted and used to turn on or off the data correction function. The preprocessing unit shown in FIG. 20 might perform any of various processing functions other than a chromakey function. Examples of such other functions include color format conversions such as converting between 4:2:0(YUV) and 4:4:4 formats, converting between 4:2:2 and 4:4:4 formats, and/or converting between YUV and RGB formats, a denoise function, etc.

Least-Square-Error Data Fitting

Considering now the derivation of equations (11) and (15) in more detail, suppose the feature data $f_{avg}(x)$, the weight $w_{avg}(x)$, and the fitting model, as given by:

$$g(x) = \sum_{l=0}^{L} c_l x^l. \tag{25}$$

The error E is given by:

$$E = \sum_{x} w_{acc}(x)(g(x) - f_{avg}(x))^2. \tag{26}$$

In order to minimize the error E, constrain, as given by:

$$\frac{\partial E_h}{\partial c_k^h} = 0, \text{ where } k = 0, 1, 2, \ldots, L. \tag{27}$$

Expand the above equation so as to have:

$$\sum_{x} w_{acc}(x)\left(\sum_{l} c_l^h x^l - f_{avg}(x)\right)x^k = 0 \quad \text{where } k = 0, 1, \ldots, L, \tag{28}$$

or $$\sum_{l} c_l^h \left(\sum_{x} w_{acc}(x) x^{l+k}\right) = \sum_{x} w_{acc}(x) f_{avg}(x) x^k \tag{29}$$

where $k = 0, 1, \ldots, L$.

The above is a linear system of (L+1) equations. To more simply represent the formula, define:

$$A_{l+k} = \sum_{x} w_{acc}(x) x^{l+k}, \tag{30}$$

-continued and $$B_k = \sum_x w_{acc}(x) f_{avg}(x) x^k, \quad (31)$$

then $$\sum_l c_l A_{l+k} = B_k \text{ where } k = 0, 1, 2, \ldots, L. \quad (32)$$

Express the above equations in a matrix, as given by:

$$\begin{bmatrix} A_0 & A_1 & \cdots & A_L \\ A_1 & A_2 & \cdots & A_{L+1} \\ \cdots & \cdots & \cdots & \cdots \\ A_L & A_{L-1} & \cdots & A_{2L} \end{bmatrix} \begin{bmatrix} c_0 \\ c_1 \\ \cdots \\ c_L \end{bmatrix} = \begin{bmatrix} B_0 \\ B_1 \\ \cdots \\ B_L \end{bmatrix}. \quad (33)$$

By finding an inverse matrix of [A], (L+1) coefficients of the polynomial are given by:

$$\begin{bmatrix} c_0 \\ c_1 \\ \cdots \\ c_L \end{bmatrix} = \begin{bmatrix} A_0 & A_1 & \cdots & A_L \\ A_1 & A_2 & \cdots & A_{L+1} \\ \cdots & \cdots & \cdots & \cdots \\ A_L & A_{L-1} & \cdots & A_{2L} \end{bmatrix}^{-1} \begin{bmatrix} B_0 \\ B_1 \\ \cdots \\ B_L \end{bmatrix}. \quad (34)$$

Thus, the exemplary embodiments provide an innovative method, system and device related to the dynamic data correction of non-uniformity in video data or streams for applications of live video composition. The exemplary method includes extracting features from live video dynamically, and hence there is no need to remove any foreground objects from a scene. In other words, the extracted features describe with certainty the dynamic characteristics of non-uniformity in live video data due to such causes as camera movement and movement of light(s). Then, a data-fitting technique is employed to construct a correction factor with a continuous curve from the extracted features. By such construction, the correction is strongly immune from noise, which is not only because the extracted features are from statistical mass data, but also because the data fitting tends to minimize the sum of square errors between an ideal model and the statistically deviated real data. Furthermore, the correction factors are of continuity on high order of derivative and hence no hard-switch correction occurs among neighboring pixels. Finally, the derived correction factor can be applied to either alpha data or video data, or both.

The exemplary embodiments also provide a good platform for future expansion, wherein a better algorithm can be used to construct a better correction factor based on extracted video features. For example, data fitting models can be easily altered to match real scenes, such as a scene with seams on back walls and floors, and the like. Moreover, the exemplary embodiments describe various implementations of an exemplary theoretic method, and include devices for such implementations.

The devices and subsystems of the exemplary embodiments described with respect to FIGS. 1-20 can communicate, for example, over a communications network, and can include any suitable servers, workstations, personal computers (PCs), laptop computers, PDAs, Internet appliances, set top boxes, modems, handheld devices, telephones, cellular telephones, wireless devices, other devices, and the like, capable of performing the processes of the disclosed exemplary embodiments. The devices and subsystems, for example, can communicate with each other using any suitable protocol and can be implemented using a general-purpose computer system, and the like. One or more interface mechanisms can be employed, for example, including Internet access, telecommunications in any suitable form, such as voice, modem, and the like, wireless communications media, and the like. Accordingly, the communications network can include, for example, wireless communications networks, cellular communications networks, satellite communications networks, Public Switched Telephone Networks (PSTNs), Packet Data Networks (PDNs), the Internet, intranets, hybrid communications networks, combinations thereof, and the like.

As noted above, it is to be understood that the exemplary embodiments, for example, as described with respect to FIGS. 1-20, are for exemplary purposes, as many variations of the specific hardware and/or software used to implement the disclosed exemplary embodiments are possible. For example, the functionality of the devices and the subsystems of the exemplary embodiments can be implemented via one or more programmed computer systems or devices. To implement such variations as well as other variations, a single computer system can be programmed to perform the functions of one or more of the devices and subsystems of the exemplary systems. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, for example, to increase the robustness and performance of the exemplary embodiments described with respect to FIGS. 1-20.

The exemplary embodiments described with respect to FIGS. 1-20 can be used to store information relating to various processes described herein. This information can be stored in one or more memories, such as a hard disk, optical disk, magneto-optical disk, RAM, and the like, of the devices and sub-systems of the exemplary embodiments. One or more databases of the devices and subsystems can store the information used to implement the exemplary embodiments. The databases can be organized using data structures, such as records, tables, arrays, fields, graphs, trees, lists, and the like, included in one or more memories, such as the memories listed above.

All or a portion of the exemplary embodiments described with respect to FIGS. 1-20 can be conveniently implemented using one or more general-purpose computer systems, microprocessors, digital signal processors, micro-controllers, and the like, programmed according to the teachings of the disclosed invention. Appropriate software can be readily prepared by programmers of ordinary skill based on the teachings of the disclosed exemplary embodiments. In addition, the exemplary embodiments can be implemented by the preparation of Application-Specific Integrated Circuits (ASICs) or by interconnecting an appropriate network of component circuits.

Thus, more generally, embodiments of the invention may be implemented using further, fewer, or different elements, interconnected in a similarly or different manner, than explicitly shown in the drawings and described above.

It should also be noted that the various plots shown in the drawings are solely for the purposes of illustration. Similar or different results may be observed under different test or actual usage conditions.

While the present invention have been described in connection with a number of exemplary embodiments and implementations, the present invention is not so limited but rather covers various modifications and equivalent arrangements, which fall within the purview of the appended claims.

For example, although described above primarily in the context of methods, systems, and devices, embodiments of the invention may be implemented in other forms, such as in instructions stored on computer-readable media.

LIST OF REFERENCES

[1] Trevor M. Osborne, Terrence W. Mead, "Compensation of Losses and Defects in Telecine Devices," U.S. Pat. No. 5,327,247, Jul. 5, 1994.
[2] Akira Inoue, "Image Processing System and Its Smoothing Method for Correcting Color Fog and Backlight of A Digital Image," U.S. Pat. No. 6,346,994, Feb. 12, 2002.
[3] Michael Bakhmustsky, "Color Non-uniformity Correction Method and Apparatus," U.S. Pat. No. 6,844,883, Jan. 18, 2005.
[4] D. Tomazevic, B. Likar and F. Pernus, "Comparative Evaluation of Retrospective Shading Correction Methods," Journal of Microscopy, Vol. 208, Pt. 3, December 2002, pp. 212-223.
[5] Katsuki Tamamura, "Image Reading Apparatus," U.S. Pat. No. 7,102,787, Sep. 5, 2006.
[6] Hidemitsu Niko, "Shading Correction Circuit and Digital Camera Signal Processing Circuit Using the Same," U.S. Pat. No. 7,075,574, Jul. 11, 2006.
[7] Petrol Vlahos, "Backing Color and Luminance Nonuniformity Compensation for Linear Image Compositing," U.S. Pat. No. 5,424,781, Jun. 13, 1995.

What is claimed is:

1. A method comprising:
a feature extraction unit extracting feature data from input video data, the input video data comprising a subject shot against a backing area in a solid color;
a data fitting unit, operatively coupled to the feature extraction unit, generating a curve based on the extracted feature data;
the data fining unit forming correction factors based on the generated curve; and
a data correction unit, operatively coupled to the data fitting unit, correcting at least one of the input video data and alpha data associated with the input video data based on the correction factors.

2. The method of claim 1, wherein the feature data describe with certainty characteristics of non-uniformity in the input video data.

3. The method of claim 1, wherein the input video data comprises one of the following color spaces and respective video signal components:

| Color Space | Video Signal Components | | |
|---|---|---|---|
| CIE $YC_rC_b$ | Y: luminance | $C_r$: red color difference | $C_b$: blue color difference |
| CIE RGB | R: red primary color | G: green primary color | B: blue primary color |
| HSL | L: luminance | H: hue | S: saturation |
| HSV/HSB | V: brightness | H: hue | S: saturation |
| CYMK | C: cyan color | Y: yellow color | M: magenta |
| YUV | Y: luminance | U: modified blue difference | V: modified red difference |
| YIQ | Y: luminance | I: modified red difference | Q: modified blue difference. |

4. The method of claim 1, wherein extracting comprises:
horizontal accumulation for each row, where at row i:

$$f_{acc}^h(i) = \sum_j f(i,j)w(i,j),$$

$$w_{acc}^h(i) = \sum_j w(i,j), \text{ and}$$

average data at row i is given by:

$$f_{avg}^h(i) = \frac{f_{acc}^h(i)}{w_{acc}^h(i)}; \text{ and}$$

vertical accumulation for each column, where at column j:

$$f_{acc}^v(j) = \sum_i f(i,j)w(i,j),$$

$$w_{acc}^v(j) = \sum_i w(i,j), \text{ and}$$

average data at column j is $f_{avg}^v(j)$ given by:

$$f_{avg}^v(j) = \frac{f_{acc}^v(j)}{w_{acc}^v(j)}.$$

5. The method of claim 4, wherein generating comprises:
modelling the feature data using an L-order polynomial $$g(x) = \sum_{k=0}^{L} c_k x^k,$$

wherein a sum of weighted square errors is given by:

$$E = \sum_x w_{acc}(x)(g(x) - f_{avg}(x))^2;$$

minimizing a sum of weighted square errors to determine the (L+1) coefficients of the L-order polynomial as:

$$(c_0, c_1, c_2, \ldots, c_L) = \underset{(c_0,c_1,\ldots c_L)}{\arg\ \min}\{E\};$$

fitting the horizontal average video data to an M-order polynomial $g^h(j)$, wherein an error $E_h$ represents a difference between a fitting model and the average data from the vertical accumulation, $E_h$ being given by:

$$E_h = \sum_j w_{acc}^v(j)(g^h(j) - f_{avg}^v(j))^2,$$

$$= \sum_j w_{acc}^v(j)\left(\sum_k c_k^h j^k - f_{avg}^v(j)\right)^2;$$

minimizing $E_h$ to determine a vector of (M+1) coefficients as:

$$\begin{bmatrix} c_0^h \\ c_1^h \\ \ldots \\ c_M^h \end{bmatrix} = \begin{bmatrix} A_0^h & A_1^h & \cdots & A_M^h \\ A_1^h & A_2^h & \cdots & A_{M+1}^h \\ \ldots & \ldots & \ldots & \ldots \\ A_M^h & A_{M+1}^h & \cdots & A_{2M}^h \end{bmatrix}^{-1} \begin{bmatrix} B_0^h \\ B_1^h \\ \ldots \\ B_M^h \end{bmatrix}$$

where:

$$A_k^h = \sum_j w_{acc}^v(j) j^k, k = 0, 1, \ldots, M,$$

and $$B_k^h = \sum_j w_{acc}^v(j) f_{avg}^v(j) j^k, k = 0, 1, \ldots, M;$$

fitting the vertical average video data to an N-order polynomial $g^v(i)$, wherein an error $E_v$ represents a difference between a fitting model and the average data from the horizontal accumulation, $E_v$ being given by:

$$E_v = \sum_i w_{acc}^h(i)(g^v(i) - f_{avg}^h(i))^2,$$

$$= \sum_i w_{acc}^h(i)\left(\sum_k c_k^v i^k - f_{avg}^h(i)\right)^2;$$

and minimizing $E_v$ to determine a vector of (N+1) coefficients as:

$$\begin{bmatrix} c_0^v \\ c_1^v \\ \ldots \\ c_N^v \end{bmatrix} = \begin{bmatrix} A_0^v & A_1^v & \cdots & A_N^v \\ A_1^v & A_2^v & \cdots & A_{N+1}^v \\ \ldots & \ldots & \ldots & \ldots \\ A_N^v & A_{N+1}^v & \cdots & A_{2N}^v \end{bmatrix}^{-1} \begin{bmatrix} B_0^v \\ B_1^v \\ \ldots \\ B_N^v \end{bmatrix},$$

where:

$$A_k^v = \sum_i w_{acc}^h(i) i^k, k = 0, 1, \ldots, N,$$

and $$B_k^v = \sum_i w_{acc}^h(i) f_{avg}^h(i) i^k, k = 0, 1, \ldots, N.$$

6. The method of claim 5, wherein forming comprises:

determining horizontal multiplicative correction factors as:

$$C_{mult}^h(j) = \frac{d^h}{g^h(j)} = \frac{d^h}{\sum_{k=0}^M c_k^h j^k}; \text{ and}$$

determining vertical multiplicative correction factors as:

$$C_{mult}^v(i) = \frac{d^v}{g^v(i)} = \frac{d^v}{\sum_{k=0}^N c_k^v i^k},$$

where $d^h$ and $d^v$ are constants, determined according to a method selected from the following:

| Method & Explanation | d = function($g_{max}$, $g_{min}$, $f_{ref}$) |
|---|---|
| Average the reference backing color and the in-between maximum and minimum data | $\frac{2g_{max} + g_{min} + f_{ref}}{4}$ |
| Center around reference backing color and compensate for deviation from it | $\frac{g_{max} + g_{min} + 2f_{ref}}{4}$ |
| Center around average | $\frac{g_{max} + g_{min} + f_{ref}}{3}$ |
| Suppress lightest area and illuminate darkest area | $\frac{g_{max} + g_{min}}{2}$ |
| Center around reference only | $f_{ref}$ |
| Illuminate all dark area and keep bright area unchanged but likely scale up the noise | $g_{max}$ |
| Suppress all lightest area and keep dark area unchanged, likely scale down the noise | $g_{min}$ | wherein $f_{ref}$ is a constant represented in a color component selected from the following, corresponding to the type of video data to be accumulated:

| Color Space | Video Signal Components | | |
|---|---|---|---|
| CIE $YC_rC_b$ | Y: luminance | $C_r$: red color difference | $C_b$: blue color difference |
| CIE RGB | R: red primary color | G: green primary color | B: blue primary color |
| HSL | L: luminance | H: hue | S: saturation |
| HSV/HSB | V: brightness | H: hue | S: saturation |
| CYMK | C: cyan color | Y: yellow color | M: magenta |
| YUV | Y: luminance | U: modified blue difference | V: modified red difference |
| YIQ | Y: luminance | I: modified red difference | Q: modified blue difference | wherein $f_{ref}$ obtained from one of 1) a reference backing color chosen by a user, from pictures to be processed, by means of a GUI (Graphical User Interface), and 2) a reference backing color automatically generated by an algorithm.

7. The method of claim 6, wherein forming comprises one of:

determining additive correction factors as a difference between a standard reference and the fitting model, a horizontal additive correction factor being given by:

$$C_{add}^h(j) = d^h - g^h(j), \text{ and}$$

a vertical additive correction factor being given by:

$$C_{add}{}^v(i) = d^v - g^v(i),$$

wherein only one of the additive correction factors is used in the correcting; and
determining a combined additive correction factor as:

$$C_{add}^{hv} = d^{hv}\left(1 - \frac{g^v(i)g^h(j)}{d^v d^h}\right)$$

where $d^{hv}$ is a constant selected from the following:

| Method & Explanation | $d^{hv}$ |
|---|---|
| Horizontal style | $d^h$ |
| Vertical style | $d^v$ |
| Average style | $\dfrac{d^h + d^v}{2}$ |
| Reference style | $f_{ref}$ |

8. The method of claim 7,
wherein correcting comprises performing a multiplicative correction, an additive correction, or a combined additive and multiplicative correction,
the multiplicative correction being given by:

$$f'(i,j) = f(i,j) * C_{mult}{}^v(i) * C_{mult}{}^h(j),$$

the additive correction being defined by:

$$f'(i,j) = f(i,j) + C_{add}{}^{hv}(i,j), \text{ and}$$

the combined correction being defined by combining $C_{mult}{}^v(i)$, $C_{mult}{}^h(j)$, $C_{add}{}^v(i)$, $C_{add}{}^h(j)$, including a combination selected from the following:

| Method & Explanation | f(i, j) |
|---|---|
| Adds offset horizontally then modulates vertically. | $(f(i,j) + C_{add}{}^h(j)) \times C_{mult}{}^v(i)$ |
| Adds offset vertically then modulates horizontally. | $(f(i,j) + C_{add}{}^v(i)) \times C_{mult}{}^h(j)$ |
| Modulates vertically then adds offset horizontally | $f(i,j) \times C_{mult}{}^v(i) + C_{add}{}^h(j)$ |
| Modulates horizontally then adds offset vertically | $f(i,j) \times C_{mult}{}^h(j) + C_{add}{}^v(i)$ |

9. The method of claim 1, wherein the alpha data are resultant data which are produced by feeding the input video data into a chromakey function to generate a signal of magnitude ranging from 0 to 1, and wherein the alpha data represent the opacity or transparency of the input video data in a video composition process.

10. The method of claim 4, wherein extracting comprises:
generating a weight for a pixel of the input video data;
accumulating the weight from each pixel;
accumulating a resultant value of the weight multiplied with the input video data at each pixel to be processed;
storing the accumulated weight; and
storing the accumulated resultant value.

11. A non-transitory computer-readable medium storing instructions which when executed perform the method of claim 1.

12. Apparatus comprising:
a feature extraction unit operable to extract feature data from input video data, the input video data comprising a subject shot against a backing area in a solid color;
a data fitting unit operatively coupled to the feature extraction unit and operable to generate a curve based on the feature data extracted by the feature extraction unit and to form correction factors based on the generated curve; and
a data correction unit operatively coupled to the data fitting unit and operable to correct at least one of the input video data and alpha data associated with the input video data based on the correction factors.

13. The apparatus of claim 12, wherein the feature data describes with certainty characteristics of non-uniformity in the input video data.

14. The apparatus of claim 12, wherein the input video data comprises one of the following color spaces and respective video signal components:

| Color Space | Video Signal Components | | |
|---|---|---|---|
| CIE $YC_rC_b$ | Y: luminance | $C_r$: red color difference | $C_b$: blue color difference |
| CIE RGB | R: red primary color | G: green primary color | B: blue primary color |
| HSL | L: luminance | H: hue | S: saturation |
| HSV/HSB | V: brightness | H: hue | S: saturation |
| CYMK | C: cyan color | Y: yellow color | M: magenta |
| YUV | Y: luminance | U: modified blue difference | V: modified red difference |
| YIQ | Y: luminance | I: modified red difference | Q: modified blue difference. |

15. The apparatus of claim 12, wherein the feature extraction unit is operable to extract the feature data by performing horizontal accumulation for each row, where at row i:

$$f_{acc}^h(i) = \sum_j f(i,j) w(i,j),$$

$$w_{acc}^h(i) = \sum_j w(i,j), \text{ and}$$

average data at row i is given by:

$$f_{avg}^h(i) = \frac{f_{acc}^h(i)}{w_{acc}^h(i)};$$

and by performing vertical accumulation for each column, where at column j:

$$f_{acc}^v(j) = \sum_i f(i,j) w(i,j),$$

$$w_{acc}^v(j) = \sum_i w(i,j), \text{ and}$$

average data at column j is $f_{avg}^v(j)$ given by:

$$f_{avg}^v(j) = \frac{f_{acc}^v(j)}{w_{acc}^v(j)}.$$

16. The apparatus of claim 15, wherein the data fitting unit is operable to generate a curve by:
modelling the feature data using an L-order polynomial $$g(x) = \sum_{k=0}^{L} c_k x^k,$$

wherein a sum of weighted square errors is given by:

$$E = \sum_x w_{acc}(x)(g(x) - f_{avg}(x))^2;$$

minimizing a sum of weighted square errors to determine the (L+1) coefficients of the L-order polynomial as:

$$(c_0, c_1, c_2, \ldots, c_L) = \underset{(c_0, c_1, \ldots, c_L)}{\arg\min}\{E\};$$

fitting the horizontal average video data to an M-order polynomial $g^h(j)$, wherein an error $E_h$ represents a difference between a fitting model and the average data from the vertical accumulation, $E_h$ being given by:

$$E_h = \sum_j w^v_{acc}(j)(g^h(j) - f^v_{avg}(j))^2,$$

$$= \sum_j w^v_{acc}(j)\left(\sum_k c^h_k j^k - f^v_{avg}(j)\right)^2;$$

minimizing $E_h$ to determine a vector of (M+1) coefficients as:

$$\begin{bmatrix} c^h_0 \\ c^h_1 \\ \ldots \\ c^h_M \end{bmatrix} = \begin{bmatrix} A^h_0 & A^h_1 & \cdots & A^h_M \\ A^h_1 & A^h_2 & \cdots & A^h_{M+1} \\ \cdots & \cdots & \cdots & \cdots \\ A^h_M & A^h_{M+1} & \cdots & A^h_{2M} \end{bmatrix}^{-1} \begin{bmatrix} B^h_0 \\ B^h_1 \\ \ldots \\ B^h_M \end{bmatrix}$$

where:

$$A^h_k = \sum_j w^v_{acc}(j) j^k, k = 0, 1, \ldots, M,$$

and $$B^h_k = \sum_j w^v_{acc}(j) f^v_{avg}(j) j^k, k = 0, 1, \ldots, M;$$

fitting the vertical average video data to an N-order polynomial $g^v(i)$, wherein an error $E_v$ represents a difference between a fitting model and the average data from the horizontal accumulation, $E_v$ being given by:

$$E_v = \sum_i w^h_{acc}(i)(g^v(i) - f^h_{avg}(i))^2,$$

$$= \sum_i w^h_{acc}(i)\left(\sum_k c^v_k i^k - f^h_{avg}(i)\right)^2; \text{ and}$$

minimizing $E_v$ to determine a vector of (N+1) coefficients as:

$$\begin{bmatrix} c^v_0 \\ c^v_1 \\ \ldots \\ c^v_N \end{bmatrix} = \begin{bmatrix} A^v_0 & A^v_1 & \cdots & A^v_N \\ A^v_1 & A^v_2 & \cdots & A^v_{N+1} \\ \cdots & \cdots & \cdots & \cdots \\ A^v_N & A^v_{N+1} & \cdots & A^v_{2N} \end{bmatrix}^{-1} \begin{bmatrix} B^v_0 \\ B^v_1 \\ \ldots \\ B^v_N \end{bmatrix},$$

where:

$$A^v_k = \sum_i w^h_{acc}(i) i^k, k = 0, 1, \ldots, N,$$

and $$B^v_k = \sum_i w^h_{acc}(i) f^h_{avg}(i) i^k, k = 0, 1, \ldots, N.$$

17. The apparatus of claim 16, wherein the data fitting unit is operable to form correction factors by:

determining horizontal multiplicative correction factors as:

$$C^h_{mult}(j) = \frac{d^h}{g^h(j)} = \frac{d^h}{\sum_{k=0}^{M} c^h_k j^k}; \text{ and}$$

determining vertical multiplicative correction factors as:

$$C^v_{mult}(i) = \frac{d^v}{g^v(i)} = \frac{d^v}{\sum_{k=0}^{N} c^v_k i^k},$$

where $d^h$ and $d^v$ are constants, determined according to a method selected from the following:

| Method & Explanation | d = function($g_{max}$, $g_{min}$, $f_{ref}$) |
|---|---|
| Average the reference backing color and the in-between maximum and minimum data | $\dfrac{2g_{max} + g_{min} + f_{ref}}{4}$ |
| Center around reference backing color and compensate for deviation from it | $\dfrac{g_{max} + g_{min} + 2f_{ref}}{4}$ |
| Center around average | $\dfrac{g_{max} + g_{min} + f_{ref}}{3}$ |
| Suppress lightest area and illuminate darkest area | $\dfrac{g_{max} + g_{min}}{2}$ |
| Center around reference only | $f_{ref}$ |
| Illuminate all dark area and keep bright area unchanged but likely scale up the noise | $g_{max}$ |
| Suppress all lightest area and keep dark area unchanged, likely scale down the noise | $g_{min}$ | wherein $f_{ref}$ is a constant represented in a color component selected from the following, corresponding to the type of video data to be accumulated:

| Color Space | Video Signal Components | | |
|---|---|---|---|
| CIE $YC_rC_b$ | Y: luminance | $C_r$: red color difference | $C_b$: blue color difference |
| CIE RGB | R: red primary color | G: green primary color | B: blue primary color |
| HSL | L: luminance | H: hue | S: saturation |
| HSV/HSB | V: brightness | H: hue | S: saturation |
| CYMK | C: cyan color | Y: yellow color | M: magenta |
| YUV | Y: luminance | U: modified blue difference | V: modified red difference |
| YIQ | Y: luminance | I: modified red difference | Q: modified blue difference | wherein $f_{ref}$ is obtained from one of 1) a reference backing color chosen by a user, from pictures to be processed, by means of a GUI (Graphical User Interface), and 2) a reference backing color automatically generated by an algorithm.

18. The apparatus of claim 17, wherein the data fitting unit is operable to form correction factors by one of:

determining additive correction factors as a difference between a standard reference and the fitting model, a horizontal additive correction factor being given by:

$$C_{add}^h(j) = d^h - g^h(j), \text{ and}$$

a vertical additive correction factor being given by:

$$C_{add}^v(i) = d^v - g^v(i),$$

wherein only one of the additive correction factors is used in the correcting; and determining a combined additive correction factor as:

$$C_{add}^{hv} = d^{hv}\left(1 - \frac{g^v(i)g^h(j)}{d^v d^h}\right)$$

where $d^{hv}$ is a constant selected from the following:

| Method & Explanation | $d^{hv}$ |
|---|---|
| Horizontal style | $d^h$ |
| Vertical style | $d^v$ |

-continued

| Method & Explanation | $d^{hv}$ |
|---|---|
| Average style | $\dfrac{d^h + d^v}{2}$ |
| Reference style | $f_{ref}$ |

19. The apparatus of claim 18, wherein the data correction unit is operable to correct the at least one of the input video data and the alpha data associated with the input video data by performing a multiplicative correction, an additive correction, or a combined additive and multiplicative correction, the multiplicative correction being given by:

$$f'(i,j) = f(i,j) * C_{mult}^v(i) * C_{mult}^h(j),$$

the additive correction being defined by:

$$f'(i,j) = f(i,j) + C_{add}^{hv}(i,j), \text{ and}$$

the combined correction being defined by combining $C_{mult}^v(i)$, $C_{mult}^h(j)$, $C_{add}^v(i)$, $C_{add}^h(j)$, including a combination selected from the following:

| Method & Explanation | f(i, j) |
|---|---|
| Adds offset horizontally then modulates vertically. | $(f(i, j) + C_{add}^h(j)) \times C_{mult}^v(i)$ |
| Adds offset vertically then modulates horizontally. | $(f(i, j) + C_{add}^v(i)) \times C_{mult}^h(j)$ |
| Modulates vertically then adds offset horizontally | $f(i, j) \times C_{mult}^v(i) + C_{add}^h(j)$ |
| Modulates horizontally then adds offset vertically | $f(i, j) \times C_{mult}^h(j) + C_{add}^v(i).$ |

20. The apparatus of claim 12, wherein the alpha data are resultant data which are produced by feeding the input video data into a chromakey function to generate a signal of magnitude ranging from 0 to 1, and wherein the alpha data represent the opacity or transparency of the input video data in a video composition process.

21. The apparatus of claim 15, further comprising:

a memory operatively coupled to the feature extraction unit, wherein the feature extraction unit is operable to extract the feature data by generating a weight for a pixel of the input video data; accumulating the weight from each pixel; accumulating a resultant value of the weight multiplied with the input video data at each pixel to be processed; storing the accumulated weight in the memory; and storing the accumulated resultant value.

\* \* \* \* \*